US008090344B2

(12) United States Patent
Hamadi et al.

(10) Patent No.: US 8,090,344 B2
(45) Date of Patent: Jan. 3, 2012

(54) DYNAMIC LOCATION-BASED RATING FOR PREPAID CALLS

(75) Inventors: Charles Hamadi, Roswell, GA (US); Mustafa Anwar Kazmi, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 885 days.

(21) Appl. No.: 11/781,459

(22) Filed: Jul. 23, 2007

(65) Prior Publication Data

US 2009/0029673 A1    Jan. 29, 2009

(51) Int. Cl.
*H04M 11/00* (2006.01)

(52) U.S. Cl. ........ 455/405; 455/406; 455/407; 455/408; 455/409; 455/456.1; 455/456.3; 455/456.4; 455/456.5

(58) Field of Classification Search .......... 455/406–409, 455/456, 457
See application file for complete search history.

(56) References Cited

U.S. PATENT DOCUMENTS

| | | | |
|---|---|---|---|
| 5,123,111 A | 6/1992 | Delory et al. |
| 5,353,335 A | 10/1994 | D'Urso et al. |
| 5,355,406 A | 10/1994 | Chencinski et al. |
| 5,448,633 A | 9/1995 | Jamaleddin et al. |
| 5,488,650 A | 1/1996 | Greco et al. |
| 5,493,608 A | 2/1996 | O'Sullivan |
| 5,511,114 A | 4/1996 | Stimson et al. |
| 5,537,594 A | 7/1996 | Shannon et al. |
| 5,592,535 A | 1/1997 | Klotz |
| 5,722,067 A | 2/1998 | Fougnies et al. |
| 5,737,393 A | 4/1998 | Wolf |
| 5,737,701 A | 4/1998 | Rosenthal et al. |
| 5,771,276 A | 6/1998 | Wolf |
| 5,812,639 A | 9/1998 | Bartholomew et al. |
| 5,867,570 A | 2/1999 | Bargout et al. |
| 5,946,380 A | 8/1999 | Cohen et al. |
| 5,978,456 A | 11/1999 | Takeuchi et al. |
| 5,991,407 A | 11/1999 | Murto |

(Continued)

FOREIGN PATENT DOCUMENTS

EP    1030506    8/2000

(Continued)

OTHER PUBLICATIONS

Cellular Networkin perspectives (Protocols Section); Mar. 2001.*

(Continued)

*Primary Examiner* — Kamran Afshar
*Assistant Examiner* — Edward Zhang
(74) *Attorney, Agent, or Firm* — Zagorin O'Brien Graham LLP

(57) ABSTRACT

A method and system for streamlining the calculation of a rate for a prepaid wireless call is provided. A mobile subscriber can be billed at one rate when she is within her home network and at a different rate when she is roaming in another network or can be billed at a special rate if she is within a location subject to the special rate. A time period for charging a call is allocated by the Service Control Point (SCP) and reported to the Mobile Switching Center (MSC) in the case of an outgoing call or a Gateway Mobile Switching Center (GMSC) in the case of an incoming call. A message from the MSC or GMSC to the SCP reporting an expiration of the first time period can contain information regarding a location of the prepaid subscriber. Thus, the next time period allocated by the SCP for the call can be billed at a rate that reflects the mobile subscriber's location at that time as reported by the MSC or GMSC.

18 Claims, 14 Drawing Sheets

U.S. PATENT DOCUMENTS

| | | | |
|---|---|---|---|
| 5,991,748 A | 11/1999 | Taskett | |
| 5,995,822 A | 11/1999 | Smith et al. | |
| 6,014,428 A | 1/2000 | Wolf | |
| 6,018,652 A | 1/2000 | Frager et al. | |
| 6,037,880 A | 3/2000 | Manion | |
| 6,058,300 A | 5/2000 | Hanson | |
| 6,061,433 A | 5/2000 | Polcyn et al. | |
| 6,070,067 A | 5/2000 | Nguyen et al. | |
| 6,075,855 A | 6/2000 | Christiansen et al. | |
| 6,115,601 A | 9/2000 | Ferreira | |
| 6,122,510 A | 9/2000 | Granberg | |
| 6,144,847 A | 11/2000 | Altschul et al. | |
| 6,144,938 A | 11/2000 | Surace et al. | |
| 6,157,823 A | 12/2000 | Fougnies et al. | |
| 6,167,251 A | 12/2000 | Segal et al. | |
| 6,169,975 B1 | 1/2001 | White et al. | |
| 6,181,785 B1 | 1/2001 | Adams et al. | |
| 6,185,414 B1* | 2/2001 | Brunner et al. | 455/406 |
| 6,185,545 B1 | 2/2001 | Resnick et al. | |
| 6,188,752 B1 | 2/2001 | Lesley | |
| 6,195,543 B1 | 2/2001 | Granberg | |
| 6,205,326 B1 | 3/2001 | Tell et al. | |
| 6,236,851 B1 | 5/2001 | Fougnies et al. | |
| 6,240,284 B1 | 5/2001 | Bugnon et al. | |
| 6,253,072 B1 | 6/2001 | Verdonk | |
| 6,256,504 B1 | 7/2001 | Tell et al. | |
| 6,327,363 B1 | 12/2001 | Henderson et al. | |
| 6,333,976 B2 | 12/2001 | Lesley | |
| 6,345,181 B1 | 2/2002 | Janhonen et al. | |
| 6,363,411 B1 | 3/2002 | Dugan et al. | |
| 6,373,930 B1 | 4/2002 | McConnell et al. | |
| 6,377,938 B1 | 4/2002 | Block et al. | |
| 6,393,269 B1 | 5/2002 | Hartmaier et al. | |
| 6,397,055 B1 | 5/2002 | McHenry et al. | |
| 6,404,869 B1 | 6/2002 | Henderson et al. | |
| 6,404,880 B1 | 6/2002 | Stevens | |
| 6,411,803 B1 | 6/2002 | Malackowski et al. | |
| 6,424,706 B1 | 7/2002 | Katz et al. | |
| 6,424,840 B1 | 7/2002 | Fitch et al. | |
| 6,434,126 B1 | 8/2002 | Park | |
| 6,463,130 B1 | 10/2002 | Malik | |
| 6,480,710 B1 | 11/2002 | Laybourn et al. | |
| 6,487,277 B2 | 11/2002 | Beyda et al. | |
| 6,487,401 B2 | 11/2002 | Suryanarayana et al. | |
| 6,490,450 B1 | 12/2002 | Batni et al. | |
| 6,493,547 B1 | 12/2002 | Raith | |
| 6,496,690 B1 | 12/2002 | Cobo et al. | |
| 6,496,691 B1 | 12/2002 | Easley et al. | |
| 6,507,644 B1 | 1/2003 | Henderson et al. | |
| 6,516,190 B1 | 2/2003 | Linkola | |
| 6,526,273 B1 | 2/2003 | Link, II et al. | |
| 6,542,601 B1 | 4/2003 | Hernandez et al. | |
| 6,594,484 B1 | 7/2003 | Hitchings, Jr. | |
| 6,625,439 B2 | 9/2003 | Laybourn et al. | |
| 6,671,506 B1 | 12/2003 | Lee | |
| 6,671,523 B1 | 12/2003 | Niepel et al. | |
| 6,684,072 B1 | 1/2004 | Anvekar et al. | |
| 6,705,520 B1 | 3/2004 | Pitroda et al. | |
| 6,728,353 B1 | 4/2004 | Espejo et al. | |
| 6,741,687 B1 | 5/2004 | Coppage | |
| 6,748,066 B1 | 6/2004 | Espejo et al. | |
| 6,771,950 B1 | 8/2004 | Shupe et al. | |
| 6,904,035 B2 | 6/2005 | Requena | |
| 6,912,383 B1 | 6/2005 | Li et al. | |
| 6,934,529 B2 | 8/2005 | Bagoren et al. | |
| 6,950,876 B2 | 9/2005 | Bright et al. | |
| 6,957,058 B2 | 10/2005 | Chan et al. | |
| 6,975,852 B1 | 12/2005 | Sofer et al. | |
| 6,987,969 B1 | 1/2006 | Brunig et al. | |
| 7,050,811 B2 | 5/2006 | Grech et al. | |
| 7,088,987 B1 | 8/2006 | Espejo et al. | |
| 7,133,685 B2 | 11/2006 | Hose et al. | |
| 7,184,748 B2 | 2/2007 | Espejo et al. | |
| 7,209,890 B1 | 4/2007 | Peon et al. | |
| 7,215,942 B1 | 5/2007 | McQuaide, Jr. et al. | |
| 7,231,201 B2 | 6/2007 | Espejo et al. | |
| 7,280,645 B1 | 10/2007 | Allen et al. | |
| 7,330,110 B1 | 2/2008 | Heintzman et al. | |
| 7,463,889 B1 | 12/2008 | DiPrima et al. | |
| 7,466,806 B2 | 12/2008 | Espejo et al. | |
| 7,480,710 B1 | 1/2009 | Olson et al. | |
| 7,529,538 B2 | 5/2009 | Espejo et al. | |
| 7,539,629 B1 | 5/2009 | Peon et al. | |
| 7,609,682 B2 | 10/2009 | Ang et al. | |
| 7,653,377 B1 | 1/2010 | Espejo et al. | |
| 7,706,792 B1 | 4/2010 | DiPrima et al. | |
| 2001/0001321 A1 | 5/2001 | Resnick et al. | |
| 2001/0028705 A1 | 10/2001 | Adams et al. | |
| 2001/0049656 A1 | 12/2001 | Halkosaari et al. | |
| 2002/0029189 A1 | 3/2002 | Titus et al. | |
| 2002/0077829 A1 | 6/2002 | Brennan et al. | |
| 2002/0091572 A1 | 7/2002 | Anderson et al. | |
| 2002/0104090 A1 | 8/2002 | Stettner | |
| 2002/0107007 A1 | 8/2002 | Gerson | |
| 2002/0107738 A1 | 8/2002 | Beach et al. | |
| 2002/0115424 A1 | 8/2002 | Bagoren et al. | |
| 2002/0143634 A1 | 10/2002 | Kumar et al. | |
| 2002/0156683 A1 | 10/2002 | Stoutenburg et al. | |
| 2002/0181710 A1 | 12/2002 | Adam et al. | |
| 2002/0193093 A1 | 12/2002 | Henrikson et al. | |
| 2002/0193100 A1 | 12/2002 | Riffe et al. | |
| 2003/0002635 A1 | 1/2003 | Koch et al. | |
| 2003/0026404 A1 | 2/2003 | Joyce et al. | |
| 2003/0037176 A1 | 2/2003 | Dannehr et al. | |
| 2003/0095566 A1 | 5/2003 | Bunting et al. | |
| 2003/0119477 A1 | 6/2003 | Uppal et al. | |
| 2003/0125042 A1 | 7/2003 | Olrik et al. | |
| 2003/0126020 A1 | 7/2003 | Smith et al. | |
| 2003/0143978 A1 | 7/2003 | Cooper et al. | |
| 2003/0157925 A1 | 8/2003 | Sorber et al. | |
| 2003/0158960 A1 | 8/2003 | Engberg | |
| 2004/0063423 A1 | 4/2004 | Kagay, Jr. | |
| 2004/0097229 A1 | 5/2004 | Muhonen et al. | |
| 2004/0103191 A1 | 5/2004 | Larsson | |
| 2004/0132449 A1* | 7/2004 | Kowarsch | 455/432.1 |
| 2004/0185828 A1 | 9/2004 | Engelhart | |
| 2004/0202187 A1 | 10/2004 | Kelly et al. | |
| 2004/0228457 A1 | 11/2004 | Espejo et al. | |
| 2005/0009499 A1 | 1/2005 | Koster | |
| 2005/0075106 A1 | 4/2005 | Jiang | |
| 2005/0101292 A1 | 5/2005 | Fukui | |
| 2005/0148319 A1 | 7/2005 | Himeno | |
| 2005/0164707 A1 | 7/2005 | Batni et al. | |
| 2005/0250493 A1 | 11/2005 | Elkarat et al. | |
| 2005/0262355 A1 | 11/2005 | Banet et al. | |
| 2006/0003736 A1 | 1/2006 | Chan et al. | |
| 2006/0003766 A1 | 1/2006 | Parameswar et al. | |
| 2006/0023856 A1 | 2/2006 | Welton et al. | |
| 2006/0058010 A1* | 3/2006 | Williams et al. | 455/414.1 |
| 2006/0058049 A1 | 3/2006 | McLaughlin et al. | |
| 2006/0240820 A1 | 10/2006 | Jiang | |
| 2006/0240822 A1 | 10/2006 | Jiang | |
| 2007/0049247 A1 | 3/2007 | Espejo et al. | |
| 2007/0106569 A1 | 5/2007 | McQuaide et al. | |
| 2007/0205263 A1 | 9/2007 | Peon et al. | |
| 2007/0281687 A1 | 12/2007 | Jiang | |
| 2008/0014933 A1 | 1/2008 | Montz et al. | |
| 2008/0096525 A1 | 4/2008 | Engelhart | |
| 2008/0119162 A1 | 5/2008 | Sivalingam et al. | |
| 2008/0207181 A1 | 8/2008 | Jiang | |
| 2008/0299967 A1 | 12/2008 | Kazmi | |
| 2008/0318545 A1 | 12/2008 | Kazmi | |
| 2009/0234747 A1 | 9/2009 | Peon et al. | |
| 2010/0105369 A1 | 4/2010 | DiPrima et al. | |

FOREIGN PATENT DOCUMENTS

| | | |
|---|---|---|
| EP | 1039764 | 9/2000 |
| EP | 1372089 | 12/2003 |
| WO | WO9216078 | 9/1992 |
| WO | 9821874 | 5/1998 |
| WO | 9918713 | 4/1999 |
| WO | 0019702 | 4/2000 |
| WO | 0025507 | 5/2000 |

OTHER PUBLICATIONS

International Search Report and Written Opinion, mailed Feb. 9, 2009 for App. No. PCT/US2008/056385, 8 pages.

Mouly, Michel and Pautet, Marie-Bernadette, "The GSM System," France, 1992, pp. 569-577.

U.S. Appl. No. 11/754,808, filed May 29, 2007, titled, "Optimized CAMELTriggering for Prepaid Calling," naming inventor Mustafa Anwar Kazmi.

U.S. Appl. No. 11/765,655, filed Jun. 20, 2007, titled, "Conditional Call Treatment for Prepaid Calls," naming inventor Mustafa Anwar Kazmi.

U.S. Appl. No. 11/861,339, filed Sep. 26, 2007, titled, "Recovery of Lost Revenue in Prepaid Calls," naming inventor Mustafa Anwar Kazmi.

U.S. Appl. No. 11/846,277, filed Aug. 28, 2007, titled, "Decisionmaking for Dynamic Local Time Updates in a Prepaid Terminating Call," naming inventor Mustafa Anwar Kazmi.

U.S. Appl. No. 11/846,259, filed Aug. 28, 2007, titled, "Peak Off-Peak Rating for Prepaid Terminating Calls," naming inventor Mustafa Anwar Kazmi.

U.S. Appl. No. 11/846,299, filed Aug. 28, 2007, titled, "Determining Capability to Provide Dynamic Local Time Updates in a Prepaid Terminating Call," naming inventor Mustafa Anwar Kazmi.

3GPP Ts 02.78 v7.2.0 (Dec. 2001) Technical Specification, "3rd Generation Partnership Project; Technical Specification Group Services and System Aspects; (CAMEL); Service Definition—State 1 (Release 1998),"GSM® Global System for Mobile Communications, 34 pages.

Crowe, David, "Thirsty for new features? Get a CAMEL?", Cellular Networking Perspectives, David Crowe's Wireless Review Magazine Articles Protocols Section: Mar. 2001, 5 pages, retrieved Nov. 17, 2004 from URL: http://www.cnp-wireless.com/ArticleArchive/Wireless%20Review/200103%20CAMEL.html.

ITU-T Recommendation Q.762, "Signalling System No. 7—ISDN User Part general functions of messages and signals," International Telecommunications Union, Dec. 1999, 30 pages, URL: <https://staff.hti.bfh.ch/mdm1/Kursunterlagen/SS7/T-REC-Q.762.pdf>.

ITU-T Recommendation Q.763, "Signalling System No. 7—ISDN User Part formats and codes," International Telecommunications Union, Dec. 1999, 134 pages, URL: <https://staff.hti.bfh.ch/mdm1/Kursunterlagen/SS7/T-REC-Q.763.pdf>.

Kislak, Ali, "'Camel,' 'Customised Applications for Mobile network Enhanced Logic',"" CAMEL & IN, Demo Version 1.0, Jan. 19, 2002, 18 pages, retrieved Nov. 17, 2004 from URL: http://www.hotel-fiesta.com/4g-aliweb/MyDOCS/CAMELMExEin1CAMELin.htm.

Levy, Ira D., "Keeping the bells ringing: Account replenishment in near real time," TMA Journal, Mar./Apr. 1999, v19n2, p. 24-26.

Non-Final Office Action mailed Dec. 14, 2009 in U.S. Appl. No. 11/615,848, 10 pages.

Non-Final Office Action mailed Jan. 29, 2010 in U.S. Appl. No. 11/196,004, 14 pages.

Cloward, William H., "Sophisticated, High Speech Capacity Voice Response Application for End Users," Official Proceedings of Speech Tech '86, Media Dimensions, Inc., Apr. 30, 1986, pp. 58-61.

3rd Generation Partnership Project; Technical Specification Group Core Network; Customised Applications for Mobile network Enhanced Logic (CAMEL) Phase 4; CAMEL Application Part (CAP) specification (Release 5), 3GPP TS 29.078 5.0.0 (Jun. 2002), 222 pages.

How does PayPal Auto-Recharge Work?, Skype Help, http://support.skype.com/index.php?_a=knowledgebase&_j=questiondetails&_i=1044, printed Aug. 28, 2007, 1 page.

Joe Gadget, Purchase Coca Cola Using Your Cellphone in Japan, http://http://www.techfresh.net/gadgets/misc-gadgets/purchase-coca-cola-using-cellphone-in-japan/, Sep. 29, 2006, 5 pages.

Moshavi, Sharon, "Please Deposit No Cents," Forbes, Aug. 16, 1993, 1 page.

What is Auto credit and how do I use it?, Skype Help, http://supportskype.com/index.php?_a=knowledgebase&_j=questiondetails&_i=633, printed Aug. 28, 2007, 1 page.

Non-Final Office Action mailed Sep. 1, 2010 in U.S. Appl. No. 11/846,259, 11 pages.

Non-Final Office Action mailed Aug. 31, 2010 in U.S. Appl. No. 11/846,277, 8 pages.

Non-Final Office Action mailed Aug. 19, 2010 in U.S. Appl. No. 11/846,299, 10 pages.

Final Office Action mailed Apr. 10, 2007 in U.S. Appl. No. 11/196,004, 11 pages.

Final Office Action mailed Jan. 24, 2008 in U.S. Appl. No. 11/196,004, 14 pages.

Final Office Action mailed Dec. 22, 2008 in U.S. Appl. No. 11/196,004, 17 pages.

Final Office Action mailed Oct. 13, 2009 in U.S. Appl. No. 11/196,004, 19 pages.

Non-Final Office Action mailed Oct. 19, 2006 in U.S. Appl. No. 11/196,004, 10 pages.

Non-Final Office Action mailed Sep. 27, 2007 in U.S. Appl. No. 11/196,004, 14 pages.

Non-Final Office Action mailed Jun. 5, 2008 in U.S. Appl. No. 11/196,004, 17 pages.

Non-Final Office Action mailed Apr. 24, 2009 in U.S. Appl. No. 11/196,004, 16 pages.

Zahid Ghadialy, "CAMEL: an Introduction," Jul. 25, 2005, 11 pages.

David G. Smith, "An Introduction to GSM Enhancenments for Operator Specific Services (CAMEL),", The Institution of Electrical Engineers, 1996, 9 pages.

* cited by examiner

DYNAMIC LOCATION-BASED RATING FOR PREPAID CALLS

FIELD OF ART

Aspects described herein relate to use of CAMEL messaging in a mobile communications system to provide an efficient method and system for calculating a billing rate to be applied for a call placed or received by a prepaid mobile subscriber based on a location of the subscriber.

BACKGROUND

The use of mobile communications devices has become commonplace in today's society. As consumers of mobile communications services become more sophisticated, it becomes more important for service providers to offer more and better services in order to fully meet their subscribers' needs. Such value-added services have become an integral part of the consumer's expectations regarding their mobile communications service.

Many of these value-added services relate to the provision of Intelligent Network (IN) services such as video or music download services, automated call forwarding services, ringback tone services, prepaid services and the like. In the Global System for Mobile Communications (GSM), the Customized Application of Mobile Enhanced Logic (CAMEL) standard has been developed to aid GSM operators to offer operator-specific services to their subscribers, even if a subscriber is roaming outside their home network. These services can include call processing functions such as caller ID and call screening, call forwarding, call rerouting; charging functions such as location-based charging or personal discounts; and provision of tones and announcements to provide information regarding a call to a subscriber's mobile telephone.

CAMEL protocol is defined in a set of standards established by the ETSI (European Telecommunication Standardization Institute) and later upgraded as part of 3GPP (Third Generation Partnership Project) initiative. These standards can be found at http://webapp.etsi.org/key/queryform.asp and are incorporated by reference herein in their entirety. Additional information regarding CAMEL protocol and operations can be found in many publications. The most comprehensive work on CAMEL including the latest standardization enhancements can be found in the book titled *CAMEL, Intelligent Network for the GSM, GPRS and UMTS Networks* by Rogier Noldus, published by John, Wiley & Sons Limited (2006). Other publications that describe the architecture and operation of a mobile network using CAMEL functionality include is the publication by Paulius Meskauskas entitled "Customised Applications for Mobile Enhanced Logic (CAMEL)," for the Research Seminar on Nomadic Computing for the Department of Computer Science at the University of Helsinki; the CAMEL tutorial by Zahid Ghadialy entitled "CAMEL: An Introduction," (Jul. 25, 2004), available on the World Wide Web at http://www.3g4g.co.uk/Tutorial/ZG/zg_camel.html; "An Introduction to GSM Enhancements for Operator Specific Services (CAMEL)" (1996) by David G. Smith, published by the IEEE, Savoy Place, London. Information regarding CAMEL triggers and trigger detection points may also be found in U.S. Patent documents such as, for example, U.S. Pat. No. 7,050,811 to Grech et al. and U.S. Patent Application Publication No. 2003/0095566 to Bunting et al. Each of these documents is incorporated by reference herein.

Information regarding CAMEL networks may also be found in U.S. patent application Ser. No. 11/754,808 entitled "Optimized Camel Triggering for Prepaid Calling," filed May 29, 2007 and U.S. patent application Ser. No. 11/765,655 entitled "Conditional Call Treatment For Prepaid Calls," filed Jun. 20, 2007, both by Mustafa Kazmi, a co-inventor of the present application, each of which is hereby expressly incorporated by reference herein in its entirety.

In accordance with the basic structure for a CAMEL network, information about a mobile subscriber is contained in a database in the subscriber's Home Location Register (HLR). This information includes the identity of the mobile station, subscriber information including a subscriber profile, presence information, call forwarding options, subscription to enhanced services such as packet data and the like. The HLR may also maintain CAMEL Subscription Information (CSI) for a mobile subscriber in a CAMEL network, and such a subscriber having CSI will be referred to herein as a "CAMEL subscriber." When a CAMEL subscriber performs a location update to a different MSC in a GSM network, her subscription information is transferred and maintained in the Visitor Location Register (VLR) for that MSC. In a GSM network, the VLR is a logical entity which is often co-located with the Mobile Switching Center (MSC). When a mobile subscriber having CAMEL services in her home network roams to another network, the CAMEL Subscription Information about that roaming subscriber is temporarily stored in the VLR for that network so that the enhanced services that the subscriber has in her home network are also available to her as she roams. This helps to make a consumer's mobile service truly mobile, since she will experience the same level of service as a "visitor" in another network as she does in her own home network.

CAMEL works to enable the provision of such "seamless" mobile service by providing a protocol, known as the CAMEL Application Part (CAP), for communication between a Mobile Switching Center (MSC) handling an outgoing call or a Gateway Mobile Switching Center (GMSC) handling an incoming call and a Service Control Point (SCP). In most cases, the SCP and GMSC are in a mobile subscriber's home network, while the MSC can either be in the subscriber's home network or in a network "visited" by the mobile subscriber.

CAMEL also provides a Basic Call State Model (BCSM), which describes the different phases of call processing in the MSC. An Originating Basic Call State Model (O-BCSM) describes the call processing for a mobile-originated (MO) call, i.e., a call where the calling party is originating a call from her mobile device, whether the called device is a mobile or non-mobile device. Similarly, a Terminating Basic Call State Model (T-BCSM) describes the call processing to route a call, often known as a "terminating call," when the mobile device is the recipient of an incoming call. Both the O-BCSM and T-BCSM contain various points, or states, in the call processing between the MSC and the SCP. Each state is preceded by a transition step, or Detection Point (DP) where the call is handed over to the SCP for a determination whether the call can proceed to the next state. The DPs in a CAMEL call can either be Event Detection Points (EDP) or Trigger Detection Points (TDP). An EDP is imposed by the SCP during processing of the call, and detects significant events during the call, such as an answer by the called party or disconnection by the calling or called party. A TDP is a part of the processing for all CAMEL calls by a subscriber in a network, and forms a part of a subscriber's CAMEL Subscription Information in the HLR. Both an EDP and TDP can be described as being "armed" if they have been activated and are available for use in processing the call.

Control of a call in a CAMEL network can be managed by the SCP and the MSC or GMSC through the use of DPs (both TDPs and EDPs) and CAP operations. A CAP operation message from the SCP to the MSC can contain instructions regarding the handling of the call at that point or from that point onward. For example, Operation: RequestReportBCS-MEvent is used to arm future DPs which contain instructions for future processing. CAP operations also are used to send messages between the MSC and the SCP regarding a status of the call. For example, an operation such as Operation: EventReportBCSMEvent can be used by the MSC to report to the SCP that the call has been answered.

One of the services that CAMEL enables is prepaid mobile service, both for mobile originators and mobile recipients of calls in the mobile system. Prepaid mobile service is a popular option for many users. It can enable a user to enjoy the benefits of mobile communications without having to enter into a long-term contract. It also can be useful to facilitate management of mobile service, for example, as a parental control tool to manage a child's use of mobile services or as a management tool for corporate usage.

CAMEL enables a prepaid mobile user to both make and receive prepaid calls in both her home network and as a roamer in another network. The prepaid mobile caller's prepaid account is debited to pay charges applied for the call. The charge for the call can depend on many factors. For example, the charge can depend on whether the prepaid subscriber is in her home network or "roaming" as a visitor in another network. Alternatively, the charge can depend on whether the prepaid subscriber is eligible for a special billing rate because she is in a special location subject to a special rate. Such location-based charging requires that the SCP and the Rating Engine which is part of the Prepaid Platform have accurate information regarding a location of a prepaid subscriber.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter.

Aspects described herein relate to a method and system for providing more location-specific charging for a prepaid wireless call. For example, in many mobile networks, a mobile subscriber can be billed at one rate when she is within her home network and at a different rate when she is roaming in another network. Alternatively, a mobile subscriber can be billed at a special rate if she is within a location subject to a special rate at a time of the call. According to one or more aspects, the Service Control Point can allocate a charging time period for a call and can instruct the Mobile Switching Center to monitor for the expiration of that time period. According to aspects herein, a message from the Mobile Switching Center to the Service Control Point reporting the expiration of the time period can also contain information regarding a location of the prepaid mobile subscriber. Thus, according to one or more aspects, the next time period allocated by the SCP for the call can be charged at a rate that reflects the mobile subscriber's most recent location. The granularity of the location-based charging can be varied by changing the charging limit time period and thus changing the time period between the reporting of location updates.

DETAILED DESCRIPTION

The aspects summarized above can be embodied in various forms. The following description shows, by way of illustration, combinations and configurations in which the aspects can be practiced. It is understood that the described aspects and/or embodiments are merely examples. It is also understood that other aspects and/or embodiments can be utilized, and that structural and functional modifications can be made, without departing from the scope of the present disclosure. For example, although some aspects herein are described in the context of a mobile user in a "roaming" mode as a visitor in another network, it is well known in the art that from the point of view of signaling, all mobile users are considered to be roamers, with "home" being simply a special case of roaming. Thus, one skilled in the art would readily understand that aspects described herein in the context of a "roaming" mobile user are equally applicable to a mobile user in her home network. In addition, although the aspects herein are described in the context of a particular Basic Call State Model using particular nomenclature for the steps and operations therein, it should be noted that variations in call state configurations and protocols may be used to process prepaid mobile calls in a CAMEL network and that such variations in configuration and protocol are within the scope of the present disclosure.

Figure 1:
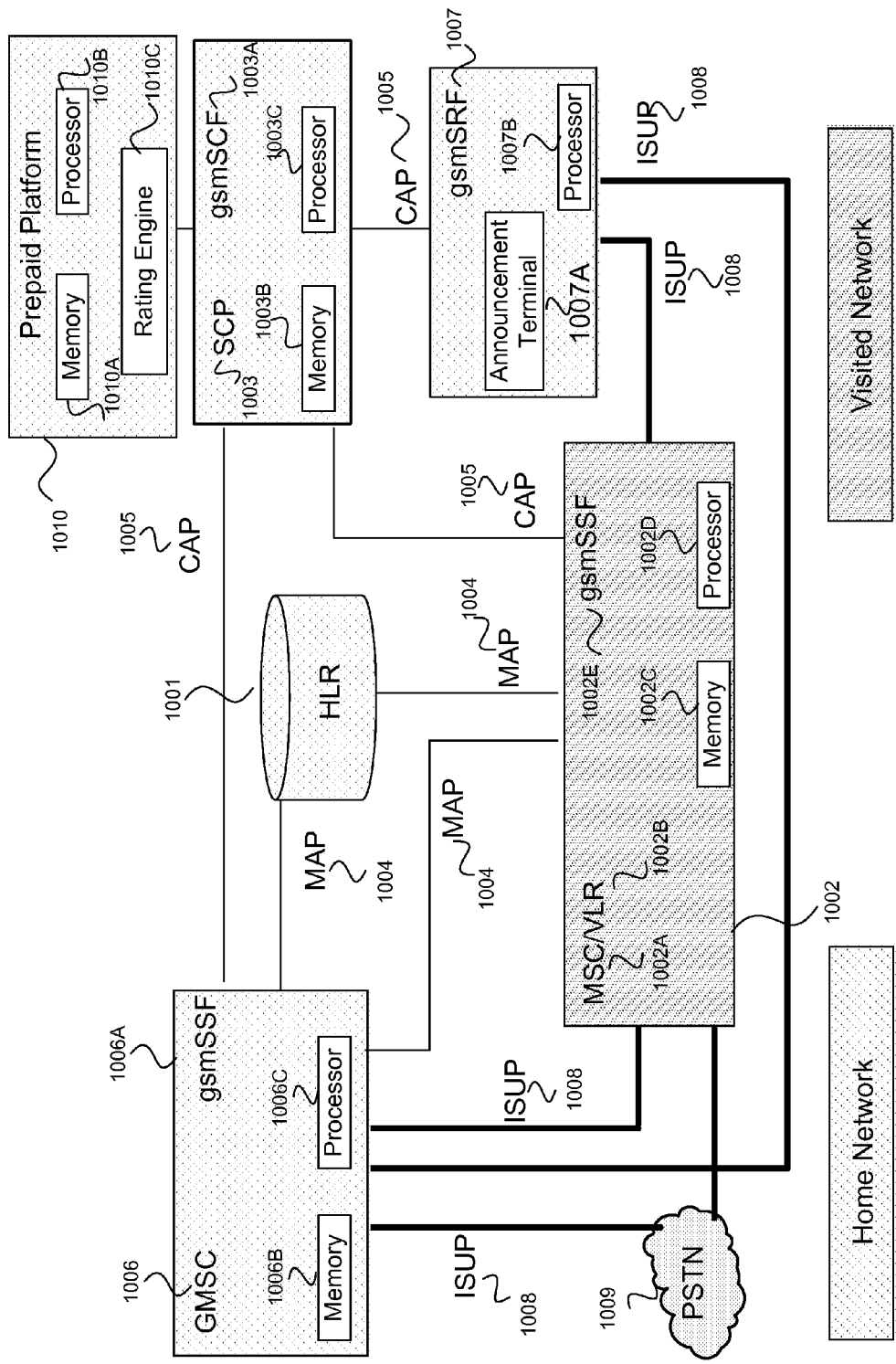
FIG. 1 is a block diagram depicting network elements in an exemplary CAMEL network according to one or more aspects described herein.

FIG. 1 depicts network elements that can be utilized in an exemplary CAMEL network in accordance with aspects herein. According to one or more aspects, signaling for call set up and call tear-down between network elements shown in FIG. 1 can be accomplished using ISDN User Part (ISUP) 1008, which is a part of the Signaling System #7 (SS7) communications protocol for signaling originating and terminating switching locations of telephone calls in a Public Switched Telephone Network (PSTN) 1009.

As shown in the configuration depicted in FIG. 1, an exemplary CAMEL network can include a Home Location Register (HLR) 1001, which can hold the CAMEL Subscription Information (CSI) for each subscriber in the CAMEL network. The CSI for a subscriber can include subscription information regarding call processing and call feature enhancements. The set of information provisioned in the HLR for the control of a mobile originating call is known as O-CSI. This includes the set of TDP that can intercept the processing of an originating call and also includes a set of parameters to control the actions at each of those TDPs. In a similar manner, the set of information provisioned in the HLR for the control of a terminating call to a mobile subscriber as recipient of the call is known in the art as "T-CSI." The T-CSI for a terminating mobile subscriber can include the set of TDPs that can intercept the processing of a terminating call towards that subscriber and a set of parameters to control the actions at each of those TDPs.

The exemplary CAMEL network shown in FIG. 1 also can include a Mobile Switching Center/Visiting Location Register (MSC/VLR) 1002. The MSC/VLR 1002 can include a Mobile Switching Center (MSC) 1002A, memory 1002C, and processor 1002D that receives and processes a mobile subscriber's request to make a call, and a database of roaming mobile subscribers within the MSC's service area, known in the art as a Visiting Location Register (VLR) 1002B. In accordance with mobile call processing methods well known in the art, when a mobile subscriber enters an area served by MSC 1002A, the subscriber's location is updated in the HLR to point to the VLR 1002B associated with that MSC. During such an update, VLR 1002B also can be updated to include the subscriber's Originating CAMEL Subscription Information (O-CSI) from the HLR 1001 via Mobile Application Part (MAP) (1004). MSC 1002A can then use the visiting mobile subscriber's O-CSI to govern processing of an outgoing mobile call originated by the subscriber.

The exemplary CAMEL network shown in FIG. 1 can also include Service Control Point (SCP) 1003, which includes a memory 1003B and a processor 1003C. In accordance with a conventional CAMEL network, the address for the SCP in a subscriber's home network is part of the subscriber's O-CSI that is obtained during an update of the VLR. During outgoing call setup for a mobile subscriber, by way of CAMEL Application Part (CAP) protocol 1005, MSC/VLR 1002 can contact SCP 1003 using GSM Service Switching Function (gsmSSF) 1002E within MSC/VLR 1002 to inform SCP 1003 that the caller is a CAMEL subscriber and that the call should be processed by Service Control Function gsmSCF 1003A as a CAMEL call according to CAMEL protocols and aspects described herein.

In accordance with one or more aspects herein, MSC/VLR 1002 can also report a location of a mobile subscriber to SCP 1003. For example, the identity of the MSC initiating the call is reported to SCP 1003 during set-up of an outgoing call. SCP 1003 and Prepaid Platform 1010 can use this information, for example, to determine an eligibility of a prepaid subscriber to make an outgoing call or to set a rate to be charged for the call. In addition, MSC/VLR 1002 can report location information to SCP 1003 as part of one or more control message from MSC/VLR 1002 to SCP 1003. This reported location information can include not only the identity of the MSC/VLR where the subscriber is registered, but also can include a more specific location within an area served by the MSC/VLR, identified by a Location Area Code, or a specific cell as identified by a Cell Global ID. For example, in accordance with cellular telephone processing aspects known in the art, each time a subscriber moves to a new cell, her device is registered with that cell. Multiple cells define a larger area, which can be identified by a Location Area Code (LAC). Thus, a location update by a mobile subscriber to the MSC/VLR can include information regarding the cell where the device is registered (CGI), a larger area encompassing multiple cells (LAC) that provides more general location information, and an even larger area served by the MSC where she is registered. This location information can then be reported by MSC 1002 to SCP 1003 for use in processing a call in accordance with aspects herein. For example, updated location information can be used to determine an eligibility of a prepaid subscriber to continue the outgoing prepaid call. In addition, in accordance with one or more aspects described herein, updated location information received at the end of one call segment can be used to determine eligibility or set a rate to be charged for a subsequent call segment.

The exemplary CAMEL network shown in FIG. 1 also depicts network elements that can be used to process an incoming call to a CAMEL mobile subscriber as a terminating party to the call. As is known in the art, when a call is made to a mobile user in the network, the call can be received by a Gateway Mobile Switching Center 1006, which also includes GSM Service Switching Function (gsmSSF) 1006A, memory 1006B, and processor 1006C. As shown in FIG. 1 and in accordance with protocols known in the art, when an incoming call directed to a mobile subscriber in a CAMEL network is received, GMSC 1006 can fetch the terminating party's Terminating CAMEL Subscription Information (T-CSI) from that mobile subscriber's HLR 1001 by sending a Send Routing Information (SRI) message to HLR 1001 via Mobile Application Part (MAP) 1004. HLR 1001 can then send a Provide Subscriber Information (PSI) message by way of Mobile Application Part (MAP) protocol 1004 to MSC/VLR 1002 where the mobile terminating subscriber is registered to obtain presence information regarding the subscriber. The information can be passed via MAP 1004 from MSC/VLR 1002 to HLR 1001 and then via MAP 1004 from HLR 1001 to GMSC 1006 and finally via CAP 1005 from GMSC to SCP 1003. SCP 1003 can use this information, for example, to determine an eligibility of a prepaid subscriber to receive an incoming call or to set a first charging rate to be applied to the call.

GMSC 1006 can also obtain information regarding the terminating mobile subscriber via ISUP interface 1008 from the MSC/VLR where the subscriber is registered. This information can include location information regarding the terminating mobile subscriber such as an identity of the MSC/VLR where the subscriber is registered or more specific location information such as location area code (LAC) that includes a range of cells or a specific cell where the subscriber is registered as identified by a Cell Global ID (CGI) or otherwise. In accordance with one or more aspects herein, GMSC 1006 can obtain updated location information during the progress of the call by means of ISUP messages from MSC/VLR 1002. ISUP messages are known in the art, and are described in publications of the International Telecommunications Union such as ITU-T Recommendation Q.762, "Signalling System No. 7—ISDN User Part general functions of messages and signals," and ITU-T Recommendation Q.763, "Signalling System No. 7—ISDN User Part formats and codes," both of which are incorporated by reference herein in their entirety. ISUP messages that can provide updated location information to GMSC 1006 can include a Call Progress Message (CPG), an Information Request Message (INR)/Information Message (INF), or a User-to-User Information Message (USR) known in the art. A Call Progress Message (CPG) can be used to report to GMSC 1006 that a significant event such as a change of LAC has occurred during the course of the call. An Information Request Message/Information Message pair also can be used by GMSC 1006 and MSC/VLR 1002 to request and obtain information relating to the call, such as the most recent location information regarding the terminating subscriber. Alternatively, a User-to-User Information Message can be used by MSC/VLR 1002 to report subscriber location information to GMSC 1006 without the need for an information request to trigger a message in response. Any of these of other similar messages can be used to communicate location information from MSC/VLR 1002 to GMSC 1006 for use in determining an eligibility of a prepaid subscriber to continue the ongoing call or in setting a charging rate in accordance with aspects herein.

Once the T-CSI is received from the HLR 1001 and the additional subscriber information is received from MSC/VLR 1002, in a similar manner as for an outgoing call, GMSC 1006 can contact Service Control Point (SCP) 1003 using gsmSSF 1006A within GMSC 1006 by way of CAMEL Application Part (CAP) protocol 1005 to inform the SCP that the terminating party is a CAMEL subscriber and that the call should be processed by Service Control Function gsmSCF 1003A as a CAMEL call in accordance with CAMEL protocols and aspects herein.

SCP 1003 also can obtain information regarding the mobile subscriber from Prepaid Platform 1010 having memory 1010A, processor 1010B, and rating engine 1010C. Memory 1010A in Prepaid Platform 1010 contains information regarding a prepaid mobile subscriber's prepaid account, for example, account balance, call charging history, and special rate information. Processor 1010B can calculate a prepaid subscriber's account balance and available funds and determine whether a prepaid subscriber has sufficient funds for a call. Rating engine 1010C can determine a rate to be applied to the call, such as a local rate, a roaming rate, or a peak/off-peak rate, based on information regarding the call or the subscriber. For example, based on location information received from MSC/VLR 1002 or GMSC 1006, Rating Engine 1010C can determine whether a call should be charged as a roaming or non-roaming call.

FIG. 1 also depicts Specialized Resource Function gsm-SRF 1007, which may contain an Announcement Terminal 1007A, as an element of a CAMEL network in accordance with aspects herein. The SCP 1003 can instruct the MSC/VLR, or GMSC, via, for example CAMEL Operation: EstablishTermporaryConnection, to set up a speech path to gsm-SRF 1007. The gsmSRF, in turn, contacts the SCP 1003 via CAP 1005 and receives messages from SCP 1003 via CAP 1005 that enables the gsmSRF to play one or more message to a caller. For example, if processor 1010B in Prepaid Platform 1010 determines that a subscriber's prepaid account balance has fallen below a predetermined limit, Prepaid Platform 1010 can instruct SCP 1003 to cause Announcement Terminal 1007A to play a message informing the caller that the balance in the subscriber's prepaid account is insufficient to permit the call to be completed.

In a CAMEL network, charges for a prepaid call can be based on the location of the prepaid subscriber, for example, whether the subscriber is in her home network or "roaming" in another network. In a conventional CAMEL network, the location of the subscriber is established at call set-up and a rate based on the subscriber's location, for example, a roaming or non-roaming rate, is applied to the entire duration of the call.

Figure 2A:
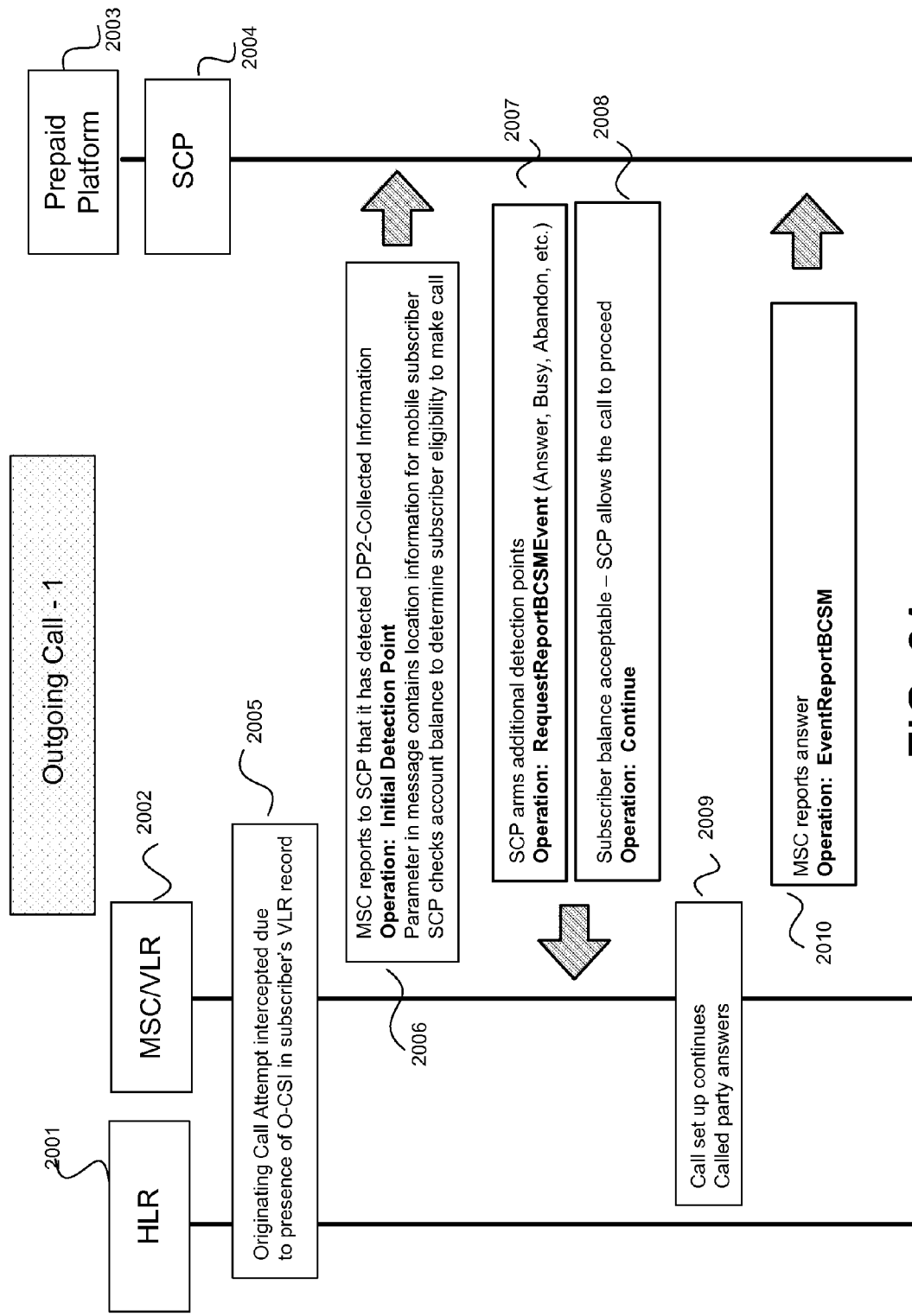
FIGS. 2A-2C depict a call flow in a CAMEL Originating Basic Call State Model in a mobile network in accordance with conventional methods.
Figure 2B:
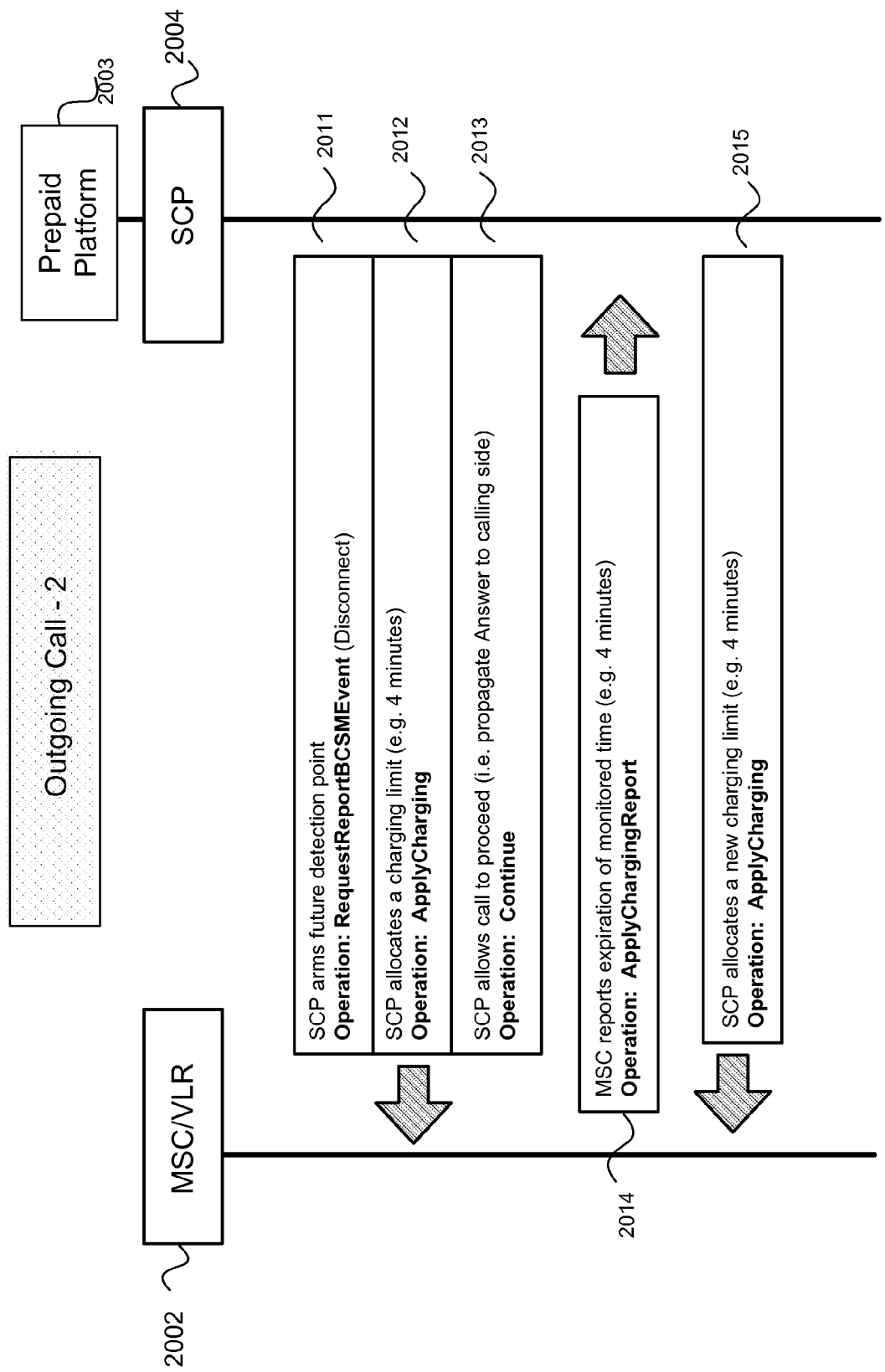
Figure 2C:
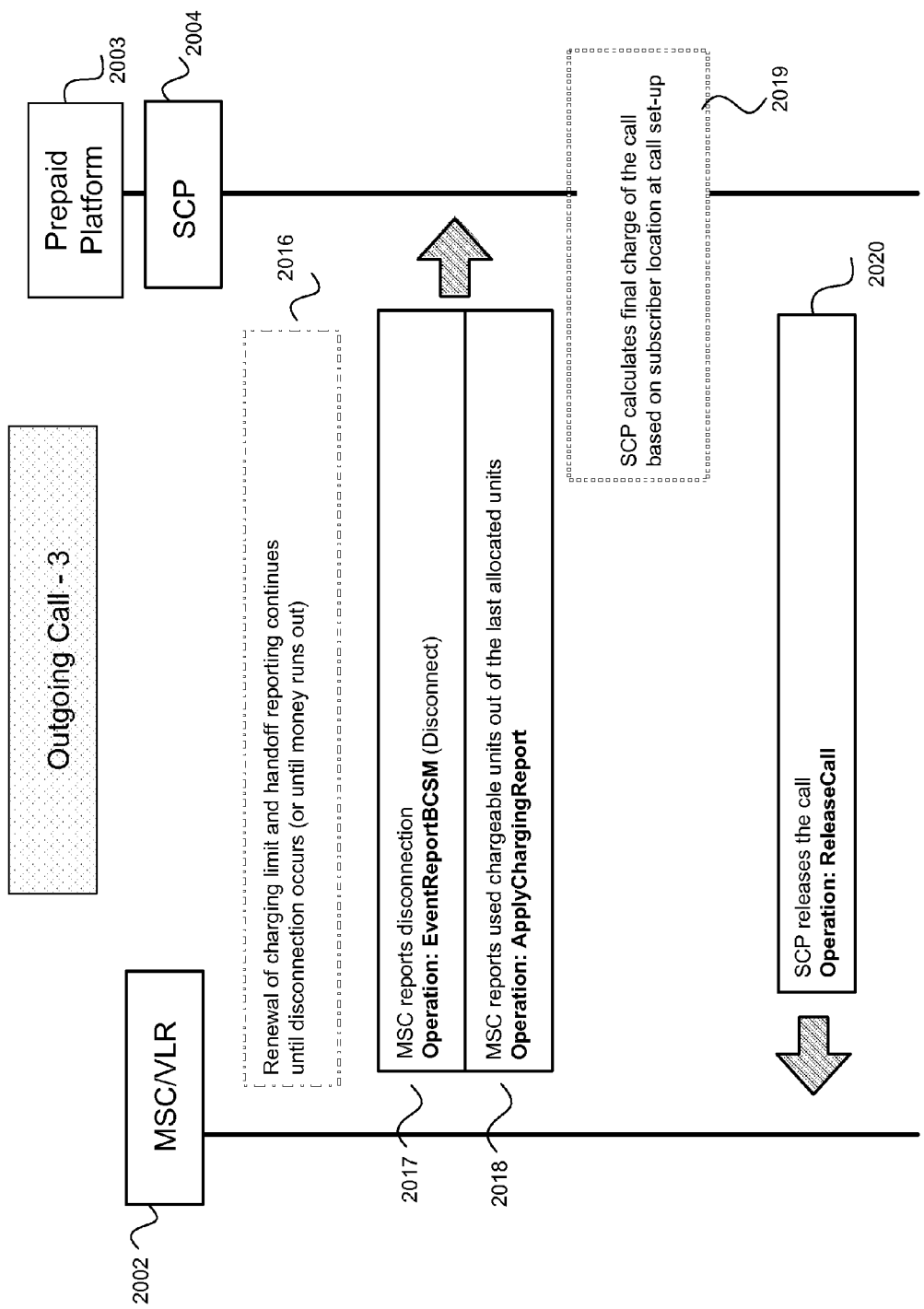

FIGS. 2A-2C depict an exemplary call flow for an originating prepaid call in a CAMEL network in accordance with conventional methods. As shown in FIGS. 2A-2C, call processing involves information flow between HLR 2001, MSC/VLR 2002, Prepaid Platform 2003, and SCP 2004. As shown in FIG. 2A, at step 2005 in the call processing flow, an outgoing call by a prepaid mobile subscriber is intercepted due to the presence of a CAMEL subscription in the caller's VLR Record. At step 2006, MSC/VLR 2002 where the subscriber is registered reports to SCP 2004 via Operation: InitialDectectionPoint (IDP) that it has detected an initial detection point, for example, DP2-Collected Information. There are parameters in the IDP operation from MSC/VLR 2002 that contain location information regarding the outgoing subscriber such as the VLR address, Location Area Code (LAC), or Cell Global Identity (CGI) associated with the subscriber's current location. In response to receiving this operation, SCP 2004 checks the mobile subscriber's prepaid account balance to determine whether the prepaid subscriber is eligible to make the prepaid outgoing call. If the subscriber is eligible to make the call, at step 2007, SCP 2004 arms additional detection points to detect call events such as Answer, Busy, Abandon, etc., and via Operation: RequestReportBCSMEvent instructs MSC/VLR 2002 to monitor for those events. Also, at step 2008, the subscriber's account balance having been found to be acceptable, SCP 2004 allows the call to proceed via Operation: Continue. At step 2009 call setup continues and the called party answers, and MSC/VLR 2002 reports the answer event to SCP 2004 at step 2010 via Operation: EventReportBCSM.

FIG. 2B depicts additional call processing in a conventional CAMEL network after the prepaid mobile call has been answered. As shown in FIG. 2B, after the call has been answered, at steps 2011 through 2013, SCP 2004 sends several instructions to MSC 2002 regarding the call. At step 2011, SCP 2004 arms one or more future detection points in the call. For example, SCP 2004 arms an Event Detection Point (EDP) for call disconnect, and advises MSC 2002 of that EDP via Operation: RequestReportBCSMEvent. The instructions from SCP 2004 to MSC 2002 also provide call duration and charging and monitoring control to ensure that charges for the completed outgoing call made by the calling prepaid mobile subscriber do not exceed the subscriber's prepaid account balance.

At step 2012, SCP 2004 allocates a charging limit time period, for example, 4 minutes, to the prepaid call and via Operation: ApplyCharging advises MSC 2002 of this charging limit time period and instructs MSC 2002 to monitor for its expiration. At step 2013, SCP 2004 instructs MSC 2002 to allow the call to proceed for this allocated time period via Operation: Continue. After the expiration of the allocated charging limit time, for example, after the expiration of 4 minutes, at step 2014, MSC 2002 reports to SCP 2004 via Operation: ApplyChargingReport that the monitored time has expired. If the caller's prepaid account balance is sufficiently high to cover an additional period or the prepaid caller is otherwise eligible to continue the call, at step 2015, SCP 2004 allocates a new charging limit, for example, another 4 minutes, and advises MSC 2002 of this new charging limit via a second iteration of Operation: ApplyCharging.

FIG. 2C depicts additional call processing for a conventional prepaid outgoing call in a CAMEL network. As seen in step 2016, the allocation, monitoring, and renewal of charging limits seen in steps 2012, 2014, and 2015 continues until the parties disconnect the call or the prepaid subscriber is no longer eligible to make the call, for example, because SCP 2004 determines that her prepaid balance is too low to permit the call to continue. Upon the occurrence of either of these events, the call is disconnected and at step 2017 MSC 2002 reports disconnection of the call to SCP 2004 via Operation: EventReportBCSM (Disconnect). At step 2018, MSC 2002 reports the chargeable time units used out of the last time units allocated for the call to SCP 2004 via Operation: ApplyChargingReport. At step 2019, SCP 2004, in conjunction with Prepaid Platform 2003, calculates the final charge for the call based on a roaming or non-roaming rate determined by the subscriber's location at call set-up. The charge for the call as so calculated is then deducted from the subscriber's prepaid account balance. When the call and the charging are completed, at step 2020, SCP 2004 instructs MSC 2002 to release the call via Operation: ReleaseCall and call processing stops.

Figure 3A:
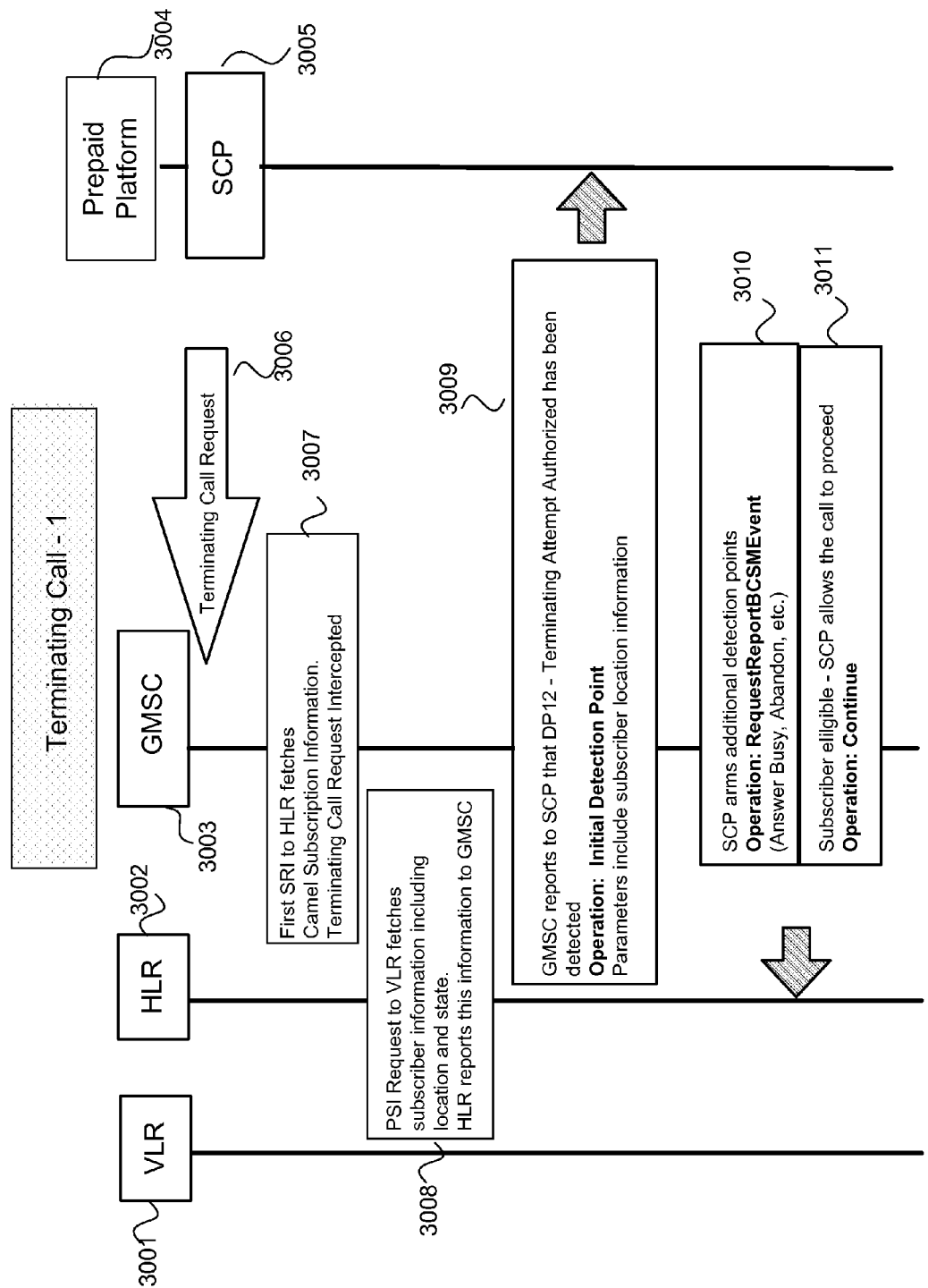
FIGS. 3A-3C depict a call flow in a CAMEL Terminating Basic Call State Model in a mobile network in accordance with conventional methods.
Figure 3B:
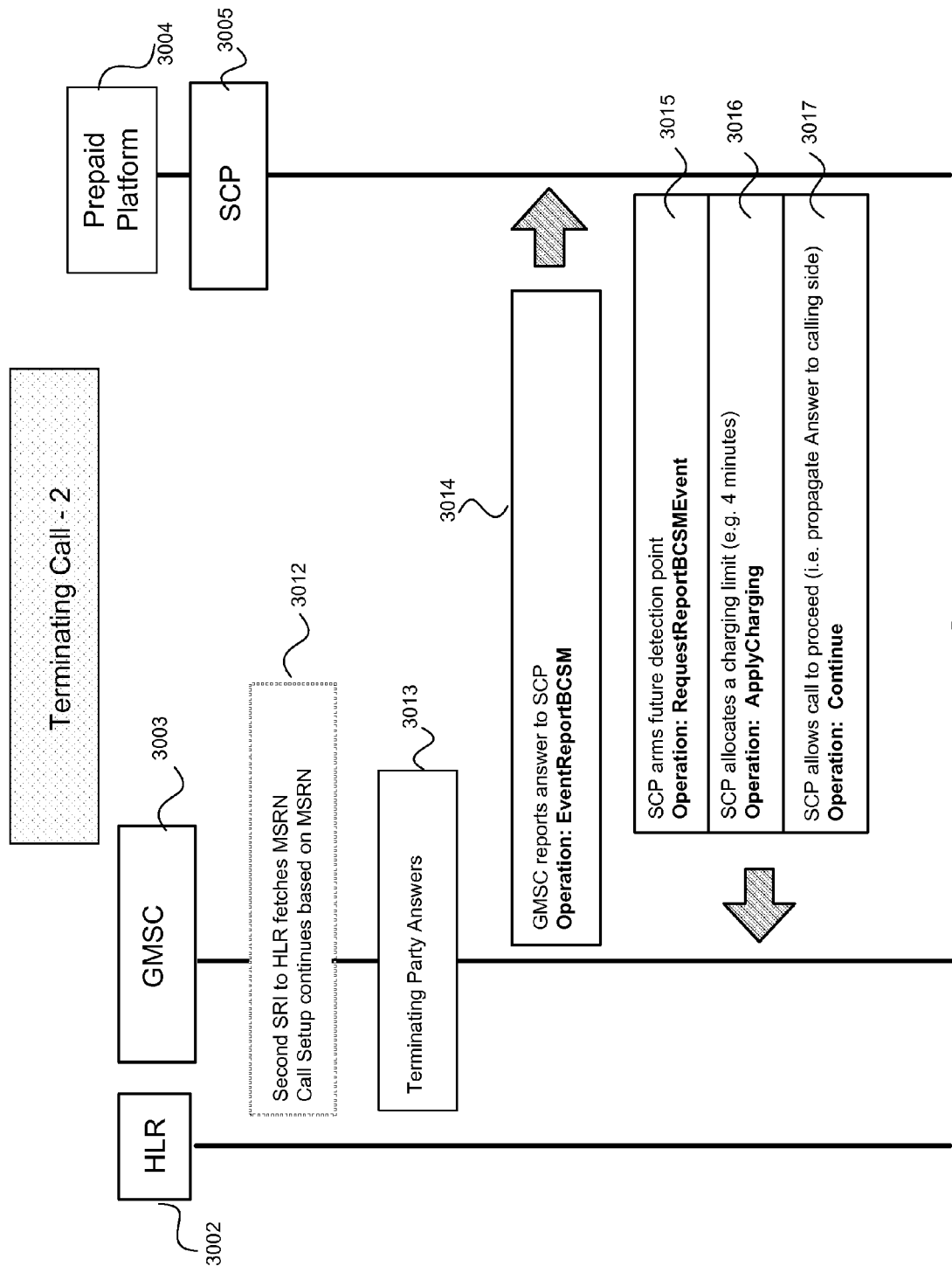
Figure 3C:
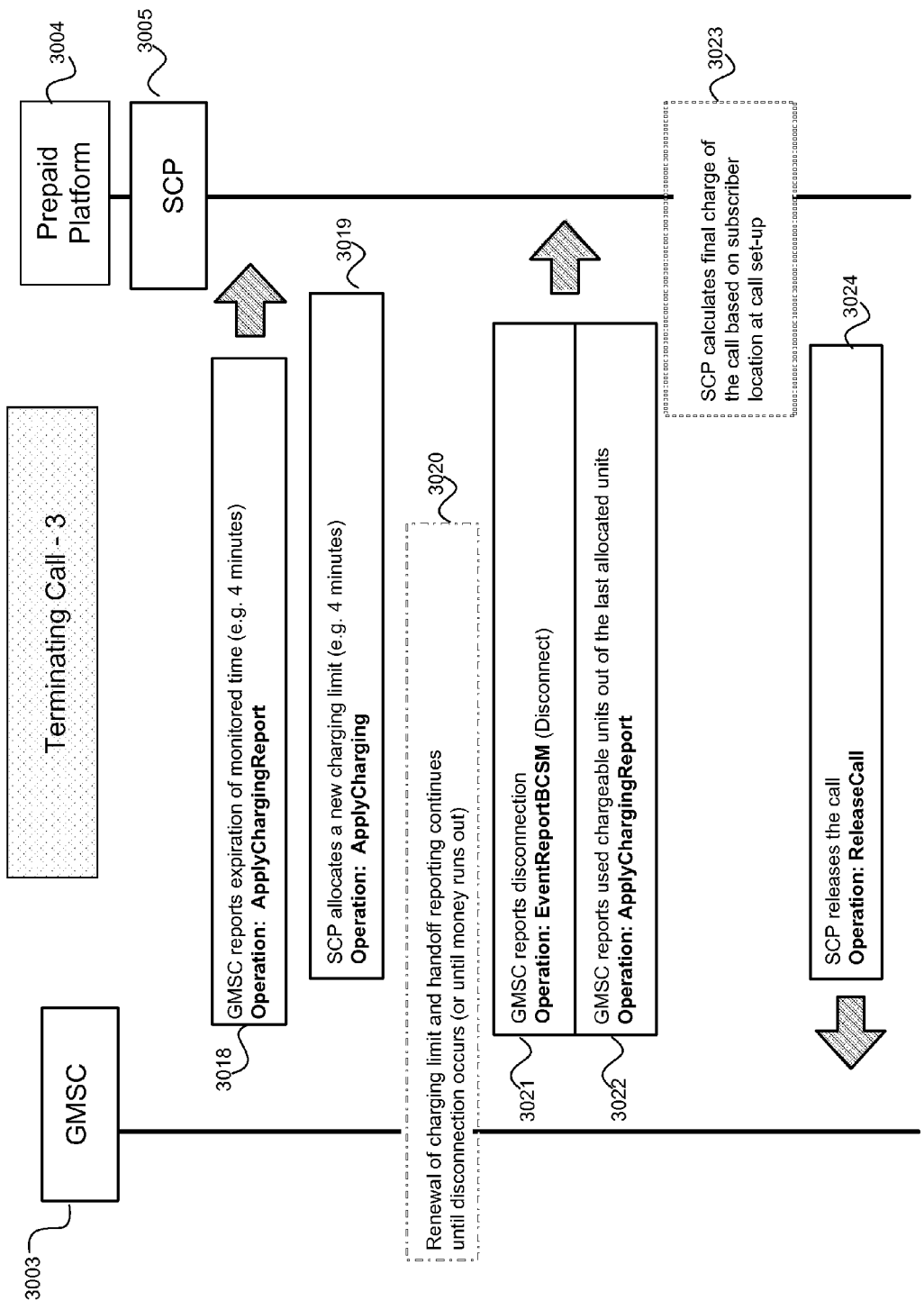

FIGS. 3A-3C depict a similar conventional call processing flow for a call in which the prepaid subscriber in a CAMEL network is the recipient of a call. As shown in FIG. 3A, a terminating call is processed by messages sent between VLR 3001, HLR 3002, GMSC 3003, Prepaid Platform 3004, and SCP 3005. As shown in FIG. 3A, at step 3006 a terminating call request to a prepaid mobile subscriber as terminating party to the call is received by GMSC 3002. GMSC 3003 sends a Send Request Information (SRI) message to HLR 3002 to fetch information regarding the subscriber from HLR 3002. Due to the presence of T-CSI in the terminating party's HLR, at step 3008, HLR 3002 sends a Provide Subscriber Information (PSI) request to the VLR 3001 where the subscriber is registered to obtain subscriber information. The information returned by VLR 3001 includes information regarding the location of the mobile subscriber, such as the identity of the MSC where she is registered, the LAC of a group of cells within the MSC, and the CGI of the specific cell where she is registered. HLR 3002 returns this information, along with her Terminating CAMEL Subscription Information (T-CSI) to GMSC 3003.

At step 3009, GMSC 3002 reports to SCP 3005 via Operation: InitialDetectionPoint that an initial detection point, for example, DP12-TerminatingAttemptAuthorized, has been detected. Parameters in the message to SCP 3005 include subscriber location information described above. This information can be used by SCP 3005 and Prepaid Platform 3004 to determine the subscriber's eligibility to receive the incoming call and to set an initial rate to be charged for the call, for example, based on whether the subscriber is in her home network or is roaming in another network.

At step 3010, SCP 3005 arms additional detection points regarding events in the call such as Answer, Busy, Abandon, etc. and advises GMSC 3003 of those detection points via Operation: RequestReportBCSMEvent. At step 3011, SCP determines that the subscriber is eligible to receive the incoming call and via Operation: Continue instructs GMSC 3003 to permit the call to proceed.

In FIG. 3B, additional call processing steps are shown. At step 3012, GMSC 3003 sends a second SRI request to HLR 3002 to obtain a temporary routable number known in the art as Mobile Station Routing Number (MSRN) so that GMSC 3003 can route the call to the mobile subscriber as terminating party even if the mobile subscriber is not in her home network. Once the call is routed to the mobile subscriber, at step 3013, the mobile subscriber as terminating party answers the call, and at step 3014, GMSC 3003 reports this answer event to SCP 3005 via Operation: EventReportBCSM.

As in the call processing for an outgoing call, after the call has been answered, at steps 3015 through 3017, SCP 3005 sends several instructions to GMSC 3003 regarding further processing of the call. At step 3015, SCP 3005 arms one or more future detection points in the call and advises GMSC 3003 of those detection points via Operation: RequestReportBCSMEvent. As is the case for an outgoing call, instructions from SCP 3005 to GMSC 3003 also can provide monitoring and control of call duration and charging. To ensure that the prepaid terminating mobile subscriber does not exceed her prepaid account balance, at step 3016, SCP 3005 allocates a charging time period limit, for example, 4 minutes, to the prepaid call, advises GMSC 3003 of this charging limit via Operation: ApplyCharging, and instructs GMSC 3003 to monitor for the expiration of the allocated time period. At step 3017, SCP 3005 instructs GMSC 3003 to allow the call to proceed via Operation: Continue.

As shown in FIG. 3C, after the expiration of the allocated time, for example, after the expiration of 4 minutes, at step 3018, GMSC 3003 reports to SCP 3005 via Operation: ApplyChargingReport that the monitored time has expired. If the caller's prepaid account balance is sufficiently high to cover an additional period or the prepaid caller is otherwise eligible to continue the call, at step 3019, SCP 3005 allocates a new charging limit time period to the call, for example, another 4 minutes, via a second iteration of Operation: ApplyCharging, and instructs GMSC 3003 to monitor for the expiration of this additional time period.

As seen in step 3020, the allocation, monitoring, and renewal of charging limits seen in steps 3016, 3018, and 3019 continues until the call is disconnected, either because parties disconnect the call or because the prepaid terminating party is no longer eligible to continue the call, for example, because her prepaid account balance is too low to permit the call to continue. At step 3021, GMSC 3003 reports to SCP 3005 that the call has been disconnected via Operation: EventReportBCSM (Disconnect) and at step 3022 reports the chargeable time units used out of the last time units allocated for the call to SCP 3005 via Operation: ApplyChargingReport. At step 3023, SCP 3005, in conjunction with Prepaid Platform 3004, calculates the final charge for the call based on a roaming or non-roaming rate as determined by the subscriber's location at call set-up. The charge for the call as so calculated is then deducted from the subscriber's prepaid account balance. When the call and charging are completed, at step 3024, SCP 3005 instructs GMSC 3003 to release the call via Operation: ReleaseCall and call processing stops.

According to one or more aspects described in more detail below, there is provided a method and system for dynamically applying a rate for a call placed or received by a prepaid mobile subscriber in a CAMEL network so that the subscriber can more accurately be charged for the call based on her location or other billing parameter.

In a method and system according to aspects described herein, the MSC (in the case of an originating call) or the GMSC (in the case of a terminating call) can include an additional parameter in its report back to the SCP that the time monitored pursuant to Operation: ApplyCharging has expired. This additional reporting parameter can include updated information regarding a location of the mobile subscriber at the time of that report so that a charging rate for the next allocated segment of time can be based on the mobile subscriber's most recent location information. In addition, in accordance with aspects herein, because a location update is provided for each call segment, the granularity of a mobile subscriber's location information reported to the SCP can be adjusted by adjusting the duration of the call segment to be monitored and reported by the MSC. Thus, for both an outgoing and an incoming call processed in accordance with aspects described herein, there can be a more accurate charging for the call based on the mobile subscriber's location without a need for additional signaling traffic between the MSC and the SCP.

Figure 4A:
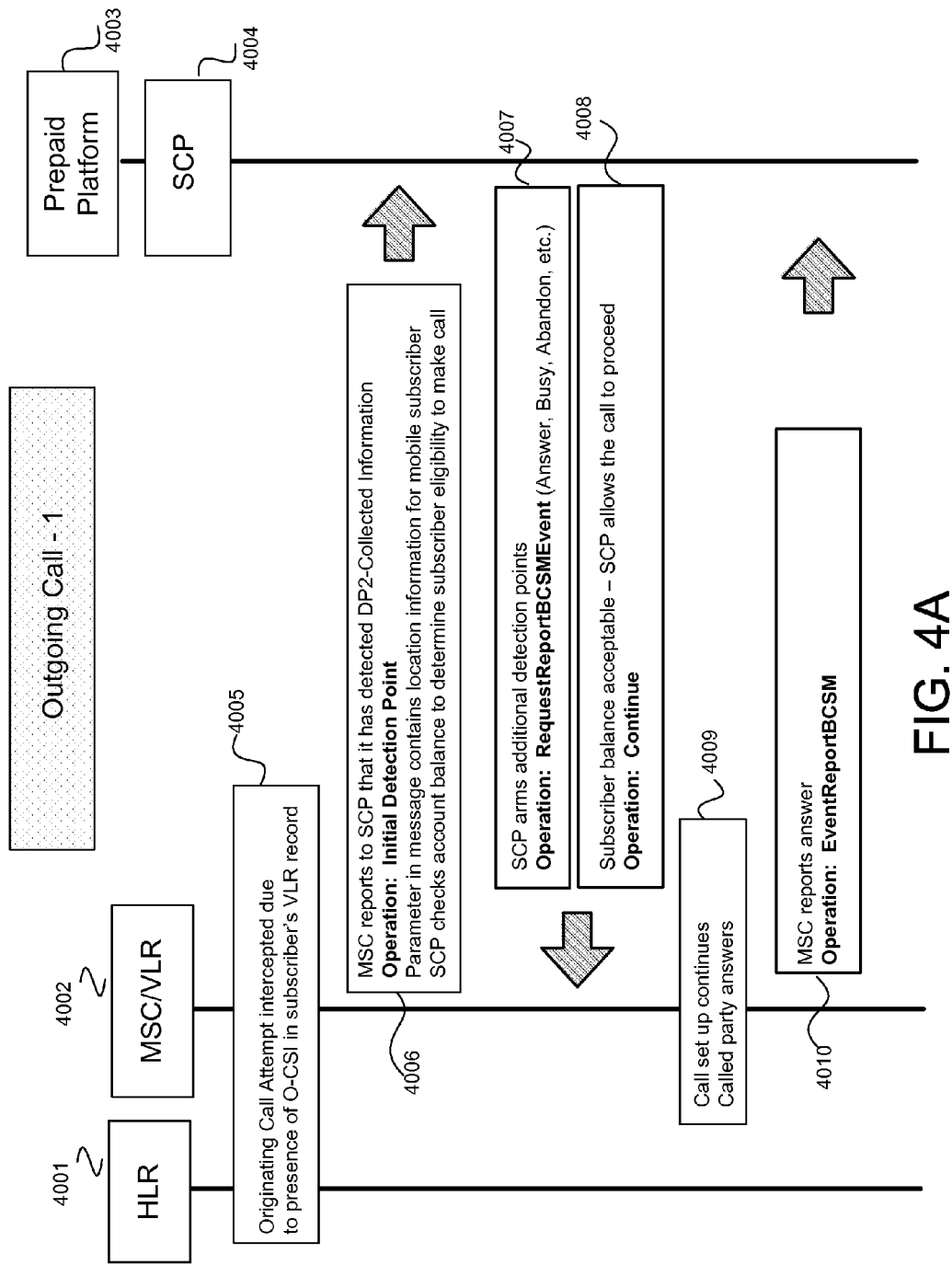
FIGS. 4A-4C depict a call flow in a CAMEL Originating Basic Call State Model in a mobile network according to one or more aspects described herein.
Figure 4B:
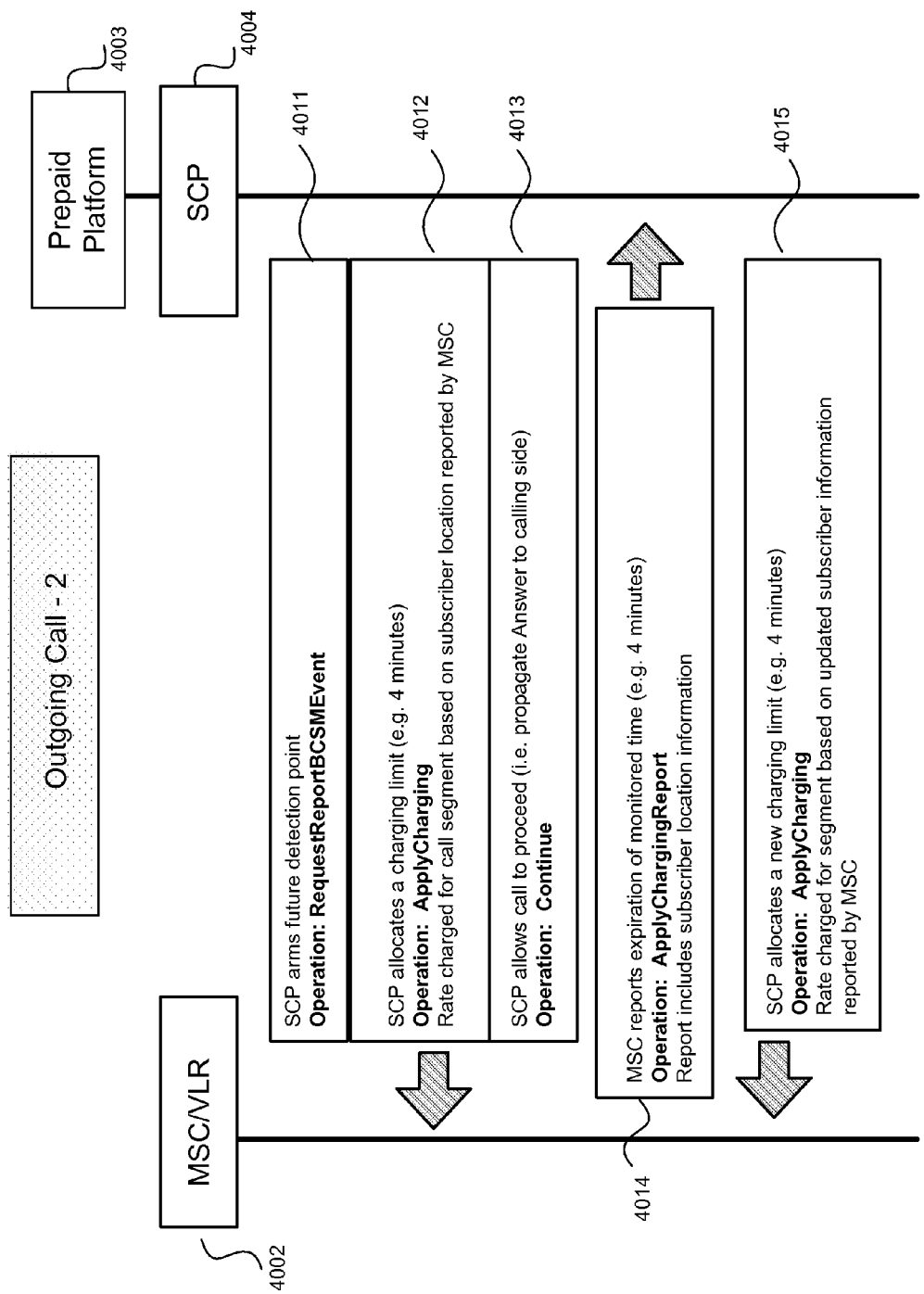
Figure 4C:
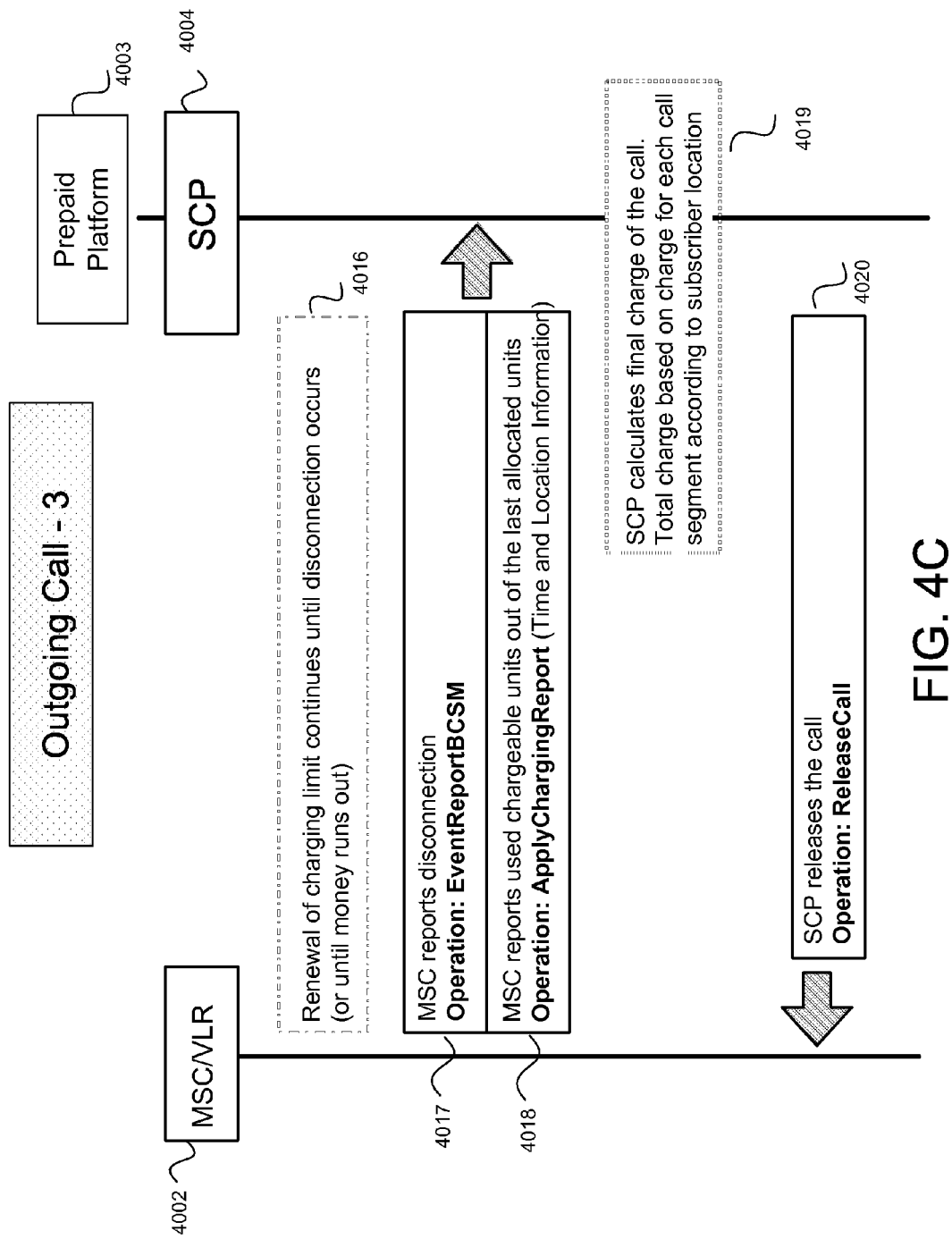

An exemplary call processing flow for an outgoing call in accordance with one or more aspects described herein is shown in FIGS. 4A-4C. As shown in FIGS. 4A-4C, an outgoing call flow in accordance with aspects herein can involve messaging between a Home Location Register (HLR) 4001, a Mobile Switching Center/Visiting Location Register (MSC/VLR) 4002 where the subscriber is registered, a Prepaid Platform 4003, and a Service Control Point (SCP) 4004.

As shown in FIG. 4A, at step 4005, an originating call attempt by a prepaid mobile subscriber can be intercepted and identified for CAMEL processing due to the presence of the subscriber's Originating CAMEL Subscription Information (O-CSI) in the subscriber's profile in VLR 4002. At step 4006, MSC/VLR 4002 can report that it has detected an initial detection point, for example, DP2-Collected Information, for the call via Operation: InitialDetectionPoint. In accordance with aspects herein, a parameter in this message from MSC 4002 to SCP 4004 can contain information regarding a location of the originating mobile subscriber such as an identity of the MSC/VLR where she is registered, the Cell Global ID of the cell currently serving the subscriber, or an identity of a group of cells identified by a Location Area Code (LAC). In response to the information in the initial detection point message, SCP 4004, alone or in conjunction with Prepaid Platform 4003, can check the originating subscriber's prepaid account balance and determine a subscriber's eligibility to make the outgoing call. For example, SCP 4004 and Prepaid Platform can use the information regarding the subscriber's location to set an initial rate for the call as a roaming or a non-roaming rate and determine whether the subscriber's prepaid account balance is sufficient to make a call based on the rate as so determined. In addition, SCP 4004 can also check other eligibility of the subscriber to make the outgoing call, such as eligibility based on the subscriber being in a special location where calls are charged at a special rate or can be placed at no charge.

Once SCP 4004 determines that the prepaid subscriber is eligible to make the outgoing call, at step 4007, SCP 4004 can arm additional event detection points for the call via Operation: RequestReportBCSMEvent, for example, to detect an Answer, Busy, or Abandoned event, and at step 4008, allows the call to continue via Operation: Continue. At step 4009, call set-up continues, the called party answers, and MSC 4002 reports this event back to SCP 4004 at step 4010 via Operation: EventReportBSCM.

Call processing in accordance with aspects described herein after the called party answers is shown in FIGS. 4B and 4C. As shown in FIG. 4B, SCP 4004 can arm future DPs to provide instruction for further processing of the call and can advise MSC 4002 of those DPs. For example, at step 4011, SCP 4004 can arm a future DP for call disconnect via Operation: RequestReportBCSMEvent (Disconnect) and can advise MSC 4002 of that DP so that when Disconnect occurs, MSC 4002 can report that occurrence to SCP 4002.

The instructions from SCP 4004 to MSC 4002 also provide call duration, charging, and monitoring control to ensure that charges for the completed outgoing call made by the calling prepaid mobile subscriber do not exceed the subscriber's prepaid account balance. As part of this charging and monitoring control, at step 4012, SCP 4004 can allocate a charging time limit for the call, for example, 4 minutes, and via Operation: ApplyCharging can advise MSC 4002 of this charging limit and instruct MSC 4002 to monitor for the expiration of this time period. At step 4013, SCP 4004 instructs MSC 4002 to allow the call to proceed for this allocated time period via Operation: Continue. After the expiration of the allocated charging limit time, that is, after the expiration of 4 minutes in the present example, at step 4014, in accordance with one or more aspects herein, MSC 4002 can report to SCP 4004 that the monitored time has expired via Operation: ApplyChargingReport.

In addition, in accordance with one or more aspects described herein, location information regarding the prepaid mobile subscriber can be included in the ApplyChargingReport message. For example, when the mobile subscriber travels to a new location within the same MSC 4002, in step 4015 the MSC can send the new location information in the form of CGI or LAC to SCP 4004 as one or more additional parameters in the operation ApplyChargingReport. On the other hand, when the subscriber travels to a location served by an MSC other than MSC 4002 originating the call, the MSC 4002, which is still in control of the CAMEL Dialogue with the SCP, can report the new location to SCP 4004 until the subscriber moves to a new MSC or back to the original MSC 4002.

Thus, in accordance with aspects described herein, the MSC 4002 serving the call can forward updated location information to SCP 4004 each time it reports to SCP 4004 that the most recent time period allocated for the call has expired. In this way, SCP 4004 can have updated location information for every call segment in a prepaid mobile call. As seen in step 4015, if the caller's prepaid account balance is sufficiently high to cover an additional period or the prepaid caller is otherwise eligible to continue the call, SCP 4004 can allocate a new charging limit time period, for example, another 4 minutes, to the call, and can advise MSC 4002 of this new charging limit via a second iteration of Operation: ApplyCharging.

In accordance with one or more aspects described herein, Rating Engine 1010C in Prepaid Platform 4003 can set a rate to be charged for this new time period based on the updated location information received from MSC 4002 at step 4010. For example, if the location information indicates that the prepaid mobile subscriber is outside her home network, a "roaming" rate can be charged for the next allocated time period, whereas if the location information indicates that she has returned to her home network, a "home" rate, which can be different from the roaming rate, can be charged. In this way, in accordance with aspects herein, the prepaid mobile subscriber can be charged a rate that reflects her location without the need for additional signaling between MSC 4002 and SCP 4004.

In addition, in accordance with one or more aspects described herein, the granularity of the location-based rate changes to be applied can easily be adjusted by changing the length of the charging time segments, and thus the time between location updates received by the SCP. For example, the charging limit time segment can be changed from 4 minutes to 2 minutes for more frequent and more granular location-based updates or from 4 minutes to 8 minutes for less-frequent and less granular location-based updates. Also, because more detailed location information is available to Prepaid Platform 4003 and Rating Engine 1010C, it can be possible to set more granular location-based charging for a call. For example, it can be possible to set a rate for a call segment based on the specific cell or group of cells where a subscriber is located, as reflected by the CGI or LAC reported by the MSC As seen in FIG. 4C, in step 4016, the allocation, monitoring, and renewal of charging time periods seen in steps 4012, 4014, and 4015 of FIG. 4B and the location updates seen in step 4015 continue until the call is ended, either because the parties end the call or because the prepaid subscriber is no longer eligible to make the call, for example, because her prepaid money runs out. Upon the occurrence of either of these events, at step 4017, disconnection of the call occurs and MSC 4002 reports disconnection of the call to SCP 4004 via Operation: EventReportBCSM. At step 4018, MSC 4002 reports the mobile subscriber's most recent location information and the chargeable time units used out of the last time units allocated for the call to SCP 4004 via Operation: ApplyChargingReport. Based on the information reported in steps 4015 and 4018, at step 4019, SCP 4004 calculates the final charge for the call to be deducted from the prepaid subscriber's prepaid account balance and instructs Prepaid Platform 4003 to debit the prepaid subscriber's account accordingly. In accordance with one or more aspects described herein, the total charge for the call is based on the charging rate applied for each call segment according to the subscriber's location as reported by MSC 4002. The call and charging having been completed, at step 4020, SCP 4004 instructs MSC 4002 to release the call via Operation: ReleaseCall and call processing stops.

Figure 5A:
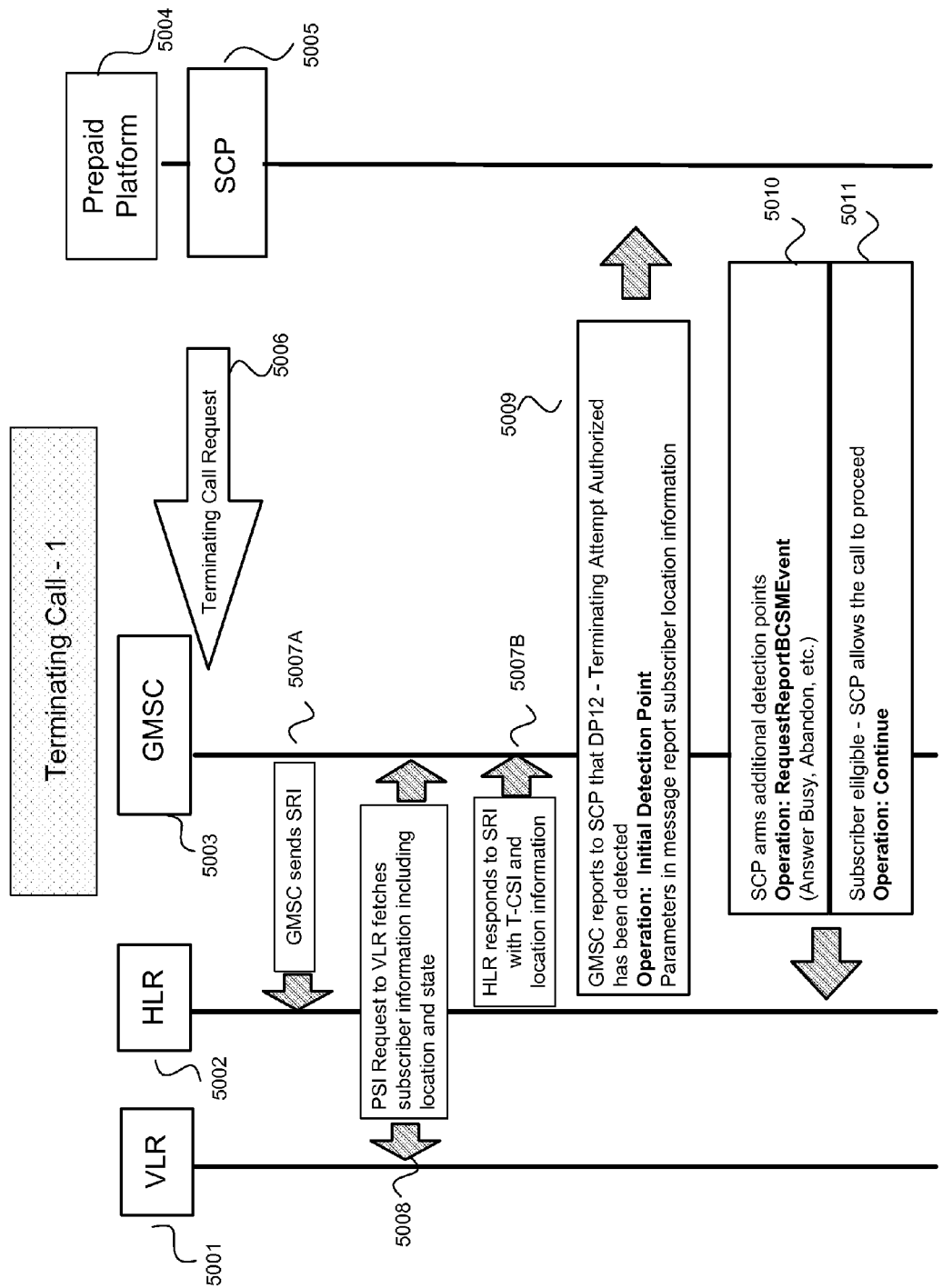
FIGS. 5A-5D depict a call flow in a CAMEL Terminating Basic Call State Model in a mobile network according to one or more aspects described herein.

Similarly, an exemplary call processing flow for a terminating call to a prepaid mobile subscriber in accordance with one or more aspects described herein is shown in FIGS. 5A-5D. As seen in FIG. 5A, a terminating call can involve messaging between a Visiting Location Register (VLR) 5001, a Home Location Register (HLR) 5002, a Gateway Mobile Switching Center (GMSC) 5003, a Prepaid Platform 5004, and a Service Control Point (SCP) 5005.

In accordance with one or more aspects, a Terminating Call Request 5006, for example, an incoming call to a prepaid mobile subscriber in a CAMEL network, can be directed to GMSC 5003. At step 5007A, upon receipt of the Terminating Call Request 5006, GMSC 5003 can send a Send Routing Information (SRI) request to HLR 5002 to obtain information necessary to set up the incoming call. This information can include the call recipient's terminating CAMEL Subscription Information (T-CSI) or other information such as a caller's eligibility to complete a call. At step 5008 HLR 5002 can send a Provide Subscriber Information request to VLR 5001 where the subscriber is registered to obtain additional information regarding the subscriber such as subscriber location and subscriber state (e.g., idle, busy, not available). In response to this request, VLR 5001 can provide information to HLR 5002 regarding the location of the mobile subscriber, such as an identity of the MSC where the subscriber is registered or more detailed location information such as a Cell Global ID (CGI) of the cell where the subscriber is located or a Location Area Code (LAC) describing a group of cells within a larger area. The HLR 5002 can pass this location information, together with the subscriber's T-CSI to GMSC 5003 in step 5007B.

During this messaging between GMSC 5003, HLR 5002, and VLR 5001, GMSC 5003 can communicate to the VLR that it would like to get dynamic updates of the current location of the subscriber for the whole duration of the call. For example, when GMSC 5003 sends an SRI to HLR 5002 it can include one or more flags to imply this intention. HLR 5002, in turn, can pass those flags to VLR 5001 in a PSI message. VLR 5001 can advise of its capability regarding dynamic update of location information in a Provide Subscriber Information Acknowledge message back to HLR 5002. HLR 5002 can then pass those flags to GMSC 5003 in an SRI Acknowledge message.

At step 5009, via Operation: InitialDetectionPoint, GMSC 5003 can report to SCP 5005 that an initial detection point for the call, for example, DP12-TerminatingAttemptAuthorized, has been detected. This message from GMSC 5003 to SCP 5005 can also include additional information regarding the prepaid subscriber, such as information regarding the prepaid subscriber's location and information as to whether GMSC 5003 can supply SCP 5005 with updated location once the call is set up. As with processing for an outgoing call, SCP 5005, alone or in conjunction with Prepaid Platform 5004, can use this information regarding the prepaid subscriber's account and location to determine whether the subscriber is eligible to receive or continue the incoming call. For example, based on the location information, SCP 5005 can determine that the incoming call is subject to a lower non-roaming rate and that the terminating prepaid subscriber's account balance is sufficiently high to permit her to receive the incoming call.

Once the eligibility of the terminating prepaid subscriber to receive the call has been determined, at step 5010, SCP 5005 can arm additional detection points for the call via Operation: RequestReportBCSMEvent, for example, to detect an Answer, Busy, or Abandon event, and at step 5011 can allow the call to continue via Operation: Continue.

Figure 5B:
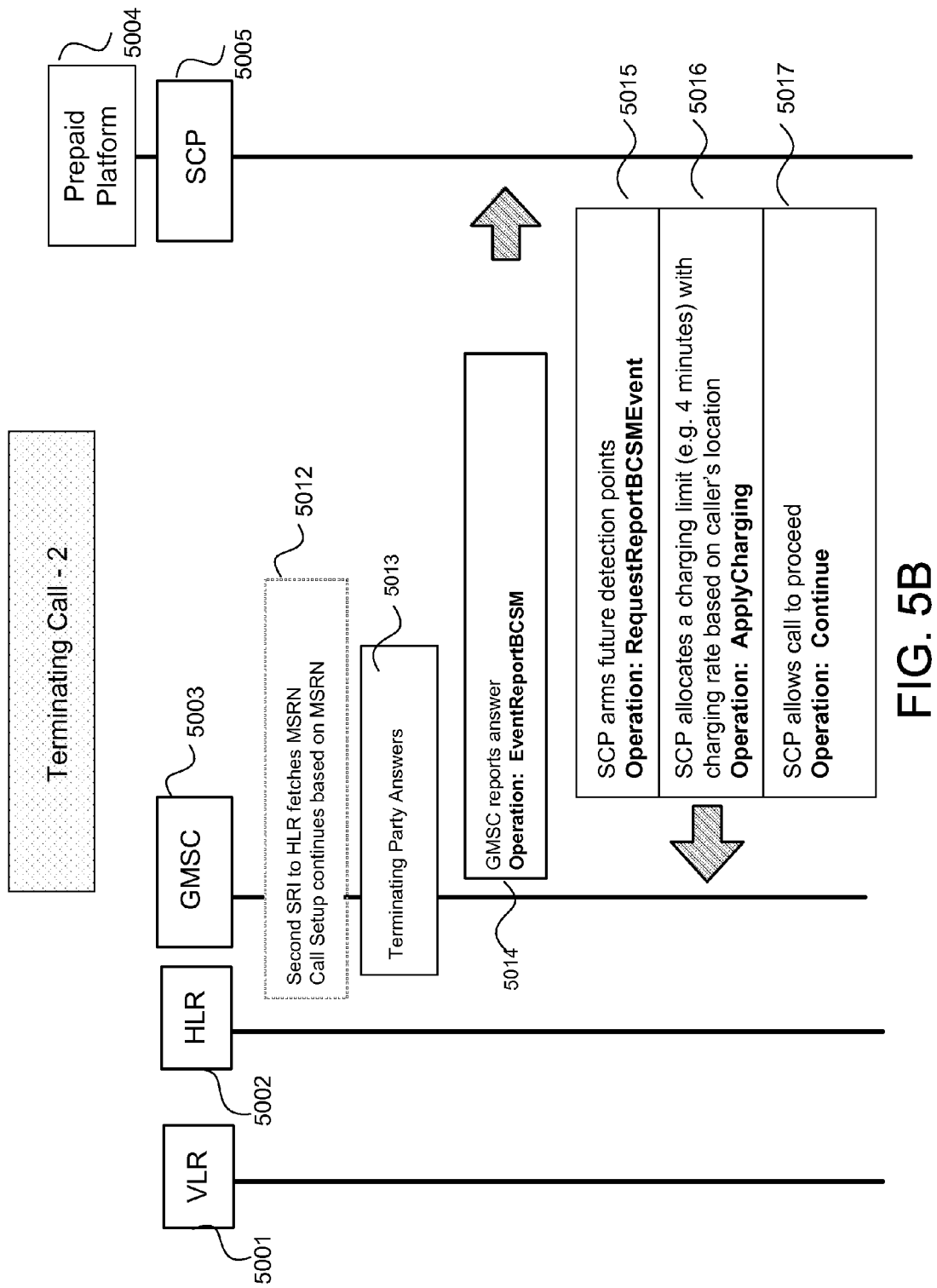

Additional call processing steps for an incoming call are shown in FIGS. 5B and FC. At step 5012, GMSC 5003 can send a second SRI request to HLR 5002 to obtain a temporary Mobile Station Routing Number (MSRN). HLR 5002 can request the MSRN from VLR 5001 and can return the same to GMSC 5003 so that the GMSC can route the call to the mobile subscriber as terminating party even if the mobile subscriber is not in her home network. Once the call is routed to the mobile subscriber, at step 5013, the prepaid mobile subscriber as answers the call, and at step 5014, GMSC 5003 can report this answer event to SCP 5005 via Operation: EventReport-BCSM. At step 5015, SCP 5005 can arm future DPs to provide instruction for further processing of the call and can advise GMSC 5003 of those DPs. For example, at step 5015, SCP 5005 can arm a future DP for call disconnect via Operation: RequestReportBCSMEvent (Disconnect) and can advise GMSC 5003 of that DP so that when Disconnect occurs, GMSC 5003 can report that occurrence to SPC 5004.

As in the case for an outgoing call, the instructions from SCP 5005 to GMSC 5003 also can provide call duration, charging, and monitoring control to ensure that charges for a terminating call received by the prepaid mobile subscriber as terminating party do not exceed the subscriber's prepaid account balance. As part of this charging and monitoring control, at step 5016, SCP 5005 can allocate a charging period time limit, for example, 4 minutes, to the prepaid call, and via Operation: ApplyCharging can advise GMSC 5003 of this charging limit and instruct GMSC 5003 to monitor for the expiration of this time period. Then, at step 5017, SCP 5005 can instruct GMSC 5003 to allow the call to proceed for this allocated time period via Operation: Continue.

Figure 5C:
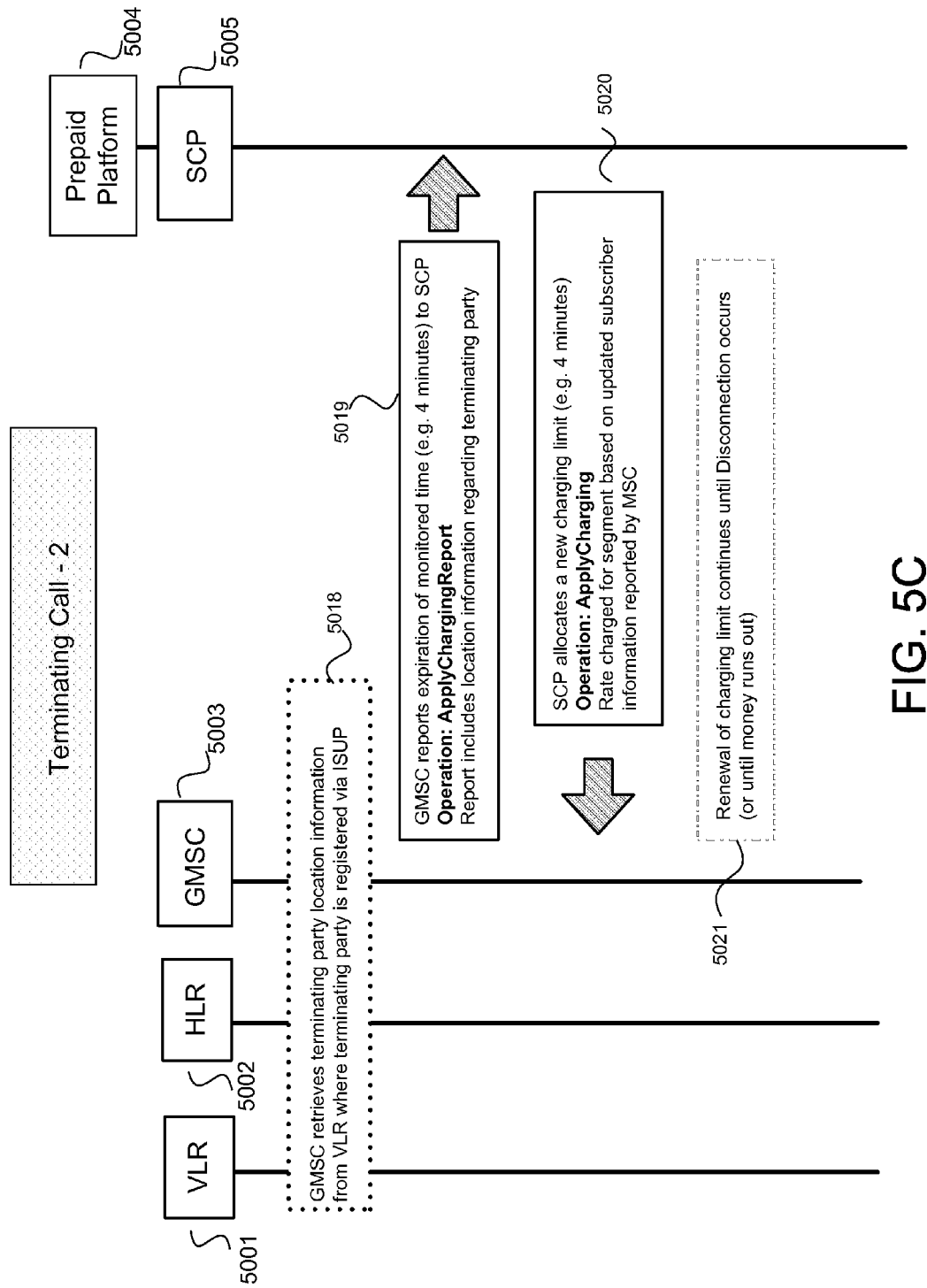

As seen in FIG. 5C, in accordance with aspects described herein, at step 5018, GMSC 5003 can retrieve location information regarding the terminating party from the VLR 5001 where the mobile terminating party is registered at one or more times during the course of the call. In accordance with one or more aspects described herein, GMSC 5003 can receive this updated location information by means of one or more ISUP messages sent from the VLR to GMSC 5003. For example, the VLR 5001 can send location information to GMSC 5003 as part of an ISUP message such as a Call Progress Message (CPG) or a User-to-User Information Message between the VLR and the GMSC. Alternatively, before reporting the expiration of the allocated charging time limit, GMSC 5003 can send an ISUP message such as an Information Request Message (INR) to VLR 5001 identified at call setup to obtain current subscriber information. VLR 5001 can then respond to the INR with the current location information. If the subscriber has moved to a location served by a different MSC, in a manner known in the art, VLR 5001 remains in the call and has information on the new location of the subscriber. In either case, the original VLR 5001 can respond to the Information Request Message by sending an ISUP message such as an Information Message (INF) back to GMSC 5003. Regardless of the type of message used, the information sent by the VLR to GMSC 5003 can identify a location of the subscriber at that time, for example, by a CGI of the cell currently serving the mobile subscriber, an LAC of a group of cells including the cell currently serving the subscriber, or an MSC serving the cell and group of cells where the subscriber is located.

For example, after the expiration of the initial 4-minute charging time limit allocated in step 5016, at step 5019, in accordance with one or more aspects herein, GMSC 5003 can report a status of the call to SCP 5005 via Operation: ApplyChargingReport. The report from GMSC 5003 to SCP 5005 can contain information that the monitored time has expired and can request an additional allocation of time to continue the call. In addition, in accordance with aspects herein, GMSC 5003 can include information regarding a location of the terminating prepaid subscriber that it received from the VLR as one or more additional parameters in the ApplyChargingReport message. Thus, in accordance with aspects herein, an ApplyChargingReport from GMSC 5003 to SCP 5005 can include updated information regarding a location of the mobile subscriber at the expiration of that call segment, and GMSC 5003 can forward this updated location information to SCP 5005 each time it reports to SCP 5005 that the most recent time period allocated for the call has expired so that SCP 5005 can have updated location information for every call segment in a prepaid mobile call.

In accordance with one or more aspects herein, SCP 5005 can use this updated location information to set a rate for a next segment of the terminating call (for example, a roaming or a non-roaming rate) or to determine whether the terminating subscriber is eligible to continue with another charging period, for example, because the terminating prepaid subscriber's account balance is sufficient to cover a charge for the next period based on the rate to be charged or because the subscriber is in a special location subject to a special rate. In accordance with one or more aspects described herein, SCP 5005 and Rating Engine 1010C in Prepaid Platform 5004 can set a rate to be charged for a new time period according to the updated location information received from GMSC 5003 in the ApplyCharging Report. For example, if the location information indicates that the prepaid mobile subscriber is outside her home network, a "roaming" rate can be charged for the next allocated time period, whereas if the location information indicates that she has returned to her home network, a "home" rate, which can be different from the roaming rate, can be charged. If the terminating prepaid mobile subscriber's prepaid account balance is sufficient to cover an additional period based on the charge to be applied for that period or the prepaid terminating party is otherwise eligible to continue the call, at step 5020, SCP 5005 can allocate a new charging time limit for the call, for example, another 4 minutes, and can advise GMSC 5003 of this new charging limit via a second iteration of Operation: ApplyCharging. In this way, in accordance with aspects herein, eligibility and charging of calls to the prepaid mobile subscriber can be determined based on her most current location without the need for additional signaling between GMSC 5003 and SCP 5005.

In addition, in accordance with one or more aspects described herein, the granularity of the location-based rate changes to be applied can easily be adjusted by changing the length of the charging time segments, and thus the time between location updates received by the SCP. For example, the charging limit time segment can be changed from 4 minutes to 2 minutes for more frequent and more granular location-based updates or from 4 minutes to 8 minutes for less-frequent and less granular location-based updates. Also, because more detailed location information is available to Prepaid Platform 5004 and Rating Engine 1010C, it can be possible to set more granular location-based charging for a call. For example, it can be possible to set a rate for a call segment based on the specific cell or group of cells where a subscriber is located, as reflected by the CGI or LAC reported by the GMSC.

In accordance with one or more aspects, in step 5021, the renewal of charging limits seen in steps 5016, 5019, and 5020 and the retrieval of location information seen in step 5018 can continue until the call is terminated, either because the parties end the call or because the prepaid subscriber is no longer eligible to make the call, for example, because she has exceeded her prepaid account balance.

Figure 5D:
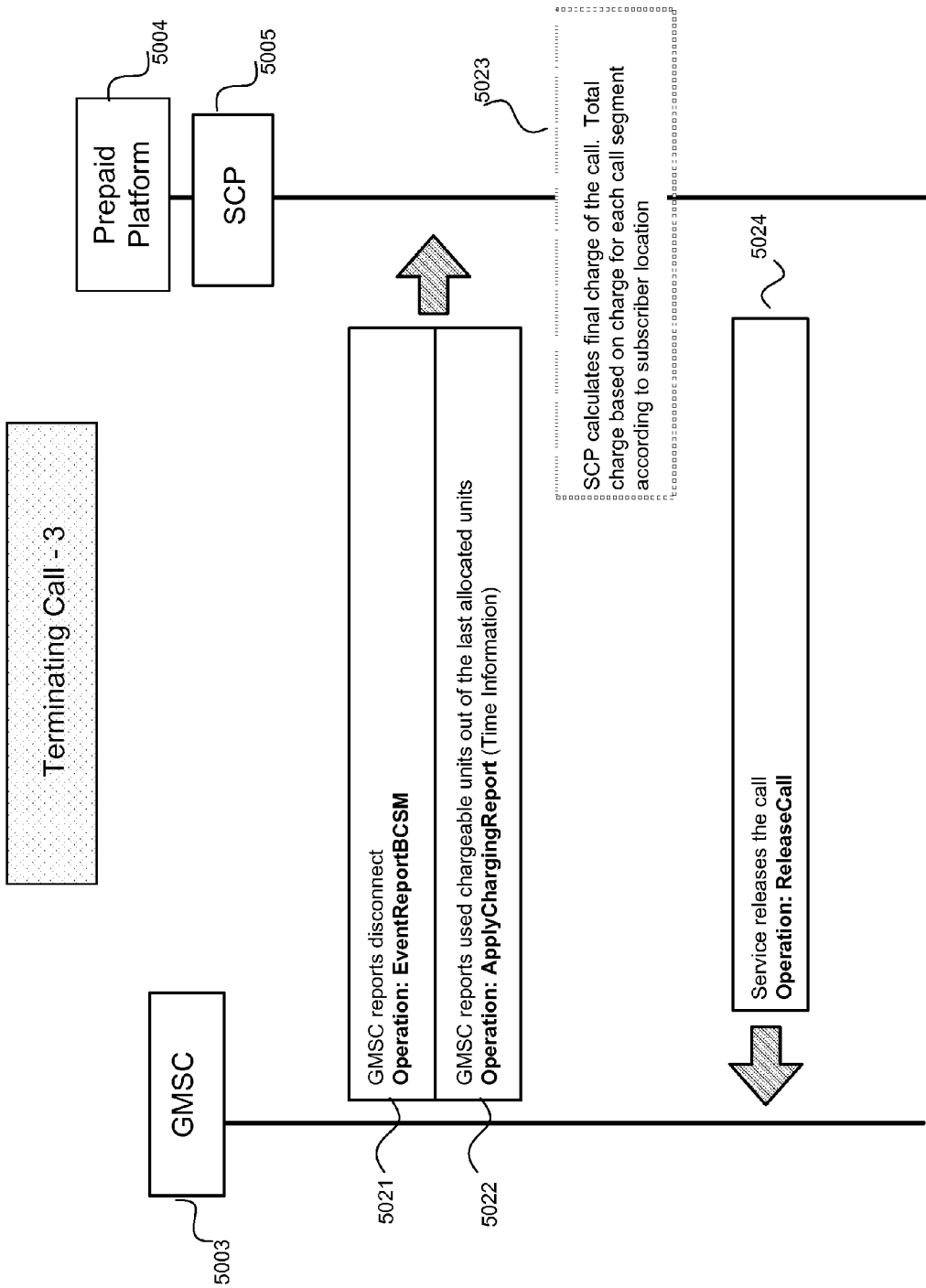

As seen in FIG. 5D, upon the occurrence of either of these events, disconnection of the call can occur and at step 5021 GMSC 5003 can report disconnection of the call to SCP 5005 via Operation: EventReportBCSM. In accordance with aspects herein, at step 5022 by way of Operation: ApplyChargingReport GMSC 5003 can report the mobile subscriber's most recent location information in a manner as described above and can also report the chargeable time units used out of the last time units allocated for the call to SCP 5005. In accordance with aspects, based on the time and location information reported in step 5022, at step 5023, SCP 5005 can calculate the final charge for the call which can be deducted from the prepaid subscriber's prepaid balance and can instruct Prepaid Platform 5004 to debit the prepaid subscriber's account accordingly. After the call and charging for the call have been completed, at step 5024, SCP 5005 can instruct GMSC 5003 to release the call via Operation: ReleaseCall and call processing can stop until the prepaid mobile subscriber places or receives another call.

Thus, in accordance with aspects described herein, it can be possible to provide a Service Control Point in a CAMEL network with updated information regarding a location of a prepaid mobile subscriber on a regular basis during a call without requiring additional signaling traffic between the Mobile Switching Center/Gateway Mobile Switching Center and the Service Control Point. In addition, in accordance with one or more aspects described herein, the granularity of the location-based rate changes to be applied can easily be adjusted by changing the length of the charging time segments, and thus the time between location updates received by the SCP. For example, the charging limit time segment can be changed from 4 minutes to 2 minutes for more frequent and more granular location-based updates or from 4 minutes to 8 minutes for less-frequent and less granular location-based updates. Also, because more detailed location information is available to a Prepaid Platform and a Rating Engine, it can be possible to set more granular location-based charging for a call. For example, it can be possible to set a rate for a call segment based on the specific cell or group of cells where a subscriber is located, as reflected by the CGI or LAC reported by the MSC.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

We claim:

1. A method for use in a communications network, the method comprising:

in response to expiration of a current charging time period having a corresponding current charging rate for a call of a prepaid communications device associated with a prepaid subscriber account, allocating a next charging time period for the call based on continued eligibility for the call of the prepaid subscriber account, the next charging time period being associated with a corresponding next charging rate based on updated location information for the prepaid communications device received in response to the expiration of the current charging time period;

reporting chargeable time units; and billing the prepaid subscriber account for the call based on the current charging time period, the corresponding current charging rate, at least one next charging time period, and at least one corresponding next charging rate, the billing including calculating a total charge for the call based on the reported chargeable time units and corresponding charging rates.

2. The method as recited in claim 1 wherein the call is originated from the prepaid communications device.

3. The method as recited in claim 2, wherein the current charging time period is an initial charging time period allocated in response to interception of the call based on Originating Customised Applications for Mobile Enhanced Logic (CAMEL) Subscription Information (O-CSI) in a VLR record associated with the prepaid subscriber account.

4. The method as recited in claim 2, wherein the eligibility is based on Originating Customised Applications for Mobile Enhanced Logic (CAMEL) Subscription Information (O-CSI) in a VLR record associated with the prepaid subscriber account.

5. The method as recited in claim 1, wherein the prepaid communications device is a terminating device of the call.

6. The method as recited in claim 5, wherein the current charging time period is an initial charging time period allocated in response to interception of the call based on Terminating Customised Applications for Mobile Enhanced Logic (CAMEL) Subscription Information (T-CSI) in a VLR record associated with the prepaid subscriber account.

7. The method as recited in claim 5, wherein the eligibility is based on Terminating Customised Applications for Mobile Enhanced Logic (CAMEL) Subscription Information (T-CSI) in a VLR record associated with the prepaid subscriber account.

8. The method as recited in claim 1, wherein allocating the next charging time period includes arming detection points that trigger a message including updated location information based on the eligibility.

9. The method as recited in claim 1, further comprising:
requesting dynamic updates of location of the prepaid communications device for the duration of the call.

10. The method as recited in claim 1, further comprising:
terminating the call when the prepaid communications device associated with the prepaid subscriber account is no longer eligible for the call or the call is disconnected.

11. An apparatus for use in a communications network, the apparatus comprising:
a memory; and
a processor, wherein the memory and processor are configured to allocate a next charging time period for a call based on continued eligibility for the call of a prepaid communications device associated with a prepaid subscriber account, the next charging time period being associated with a corresponding next charging rate based on updated location information for the prepaid communications device received in response to expiration of the current charging time period, the next charging time period for the call being allocated in response to expiration of a current charging time period associated with a current charging rate,
wherein the processor is configured to receive reported chargeable time units;
wherein the processor is configured to determine a total charge for the call based on the current charging time period, the corresponding current charging rate, at least one next charging time period, and at least one corresponding next charging rate, the total charge for the call being based on received reported chargeable time units and corresponding charging rates.

12. The apparatus as recited in claim 11, wherein the processor and memory are configured as at least a portion of a service control point.

13. The apparatus as recited in claim 12, wherein the service control point is configured to instruct a prepaid platform to apply a debit to the prepaid subscriber account.

14. The apparatus as recited in claim 12, wherein the service control point is configured to arm detection points that trigger a message including updated location information for the prepaid communications device based on eligibility of the prepaid communications device.

15. An apparatus for use in a communications network, the apparatus comprising:
a memory; and
a processor configured to provide a current rate to be applied to a current time period of a call of a prepaid communications device associated with the prepaid subscriber account based on current location information associated with the prepaid subscriber account stored in the memory, the processor being further configured to provide an indicator of continued eligibility for the call and a next rate to be applied to a next charging time period of the call allocated based on the next location information associated with the prepaid communications device received and stored in the memory in response to expiration of a current charging time period, the processor being configured to apply a total charge for the call, the total charge for the call being based on reported chargeable time units and corresponding charging rates.

16. The apparatus as recited in claim 15, wherein the processor and memory are configured as a prepaid platform.

17. The apparatus as recited in claim 16, wherein the prepaid platform is configured to provide the current rate and the next rate to a service control point.

18. The apparatus as recited in claim 16, wherein the prepaid platform is configured to apply the total charge as a debit to the prepaid subscriber account for the call.

* * * * *